US011152840B2

United States Patent
Matsuto et al.

(10) Patent No.: US 11,152,840 B2
(45) Date of Patent: Oct. 19, 2021

(54) ELECTRIC ACTUATOR

(71) Applicant: NTN CORPORATION, Osaka (JP)

(72) Inventors: Takushi Matsuto, Shizuoka (JP);
Shinsuke Hirano, Shizuoka (JP);
Atsushi Ikeda, Shizuoka (JP); Tomomi Ishikawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 402 days.

(21) Appl. No.: 16/089,786

(22) PCT Filed: Mar. 24, 2017

(86) PCT No.: PCT/JP2017/012195
§ 371 (c)(1),
(2) Date: Sep. 28, 2018

(87) PCT Pub. No.: WO2017/170292
PCT Pub. Date: Oct. 5, 2017

(65) Prior Publication Data
US 2019/0107184 A1     Apr. 11, 2019

(30) Foreign Application Priority Data

Mar. 30, 2016  (JP) .............................. JP2016-069093
Mar. 30, 2016  (JP) .............................. JP2016-069103

(51) Int. Cl.
*F16H 25/20*     (2006.01)
*H02K 11/01*     (2016.01)
(Continued)

(52) U.S. Cl.
CPC ......... *H02K 11/0141* (2020.08); *F16D 3/845* (2013.01); *F16H 25/20* (2013.01);
(Continued)

(58) Field of Classification Search
CPC ..................... F16H 25/2015; F16H 2025/2081
See application file for complete search history.

(56) References Cited

U.S. PATENT DOCUMENTS

| 5,125,280 A * | 6/1992 | Koscinski ........... F16H 25/2015 |
| | | 74/89.4 |
| 6,533,082 B2 * | 3/2003 | Gill ........................ B60T 7/107 |
| | | 188/156 |

(Continued)

FOREIGN PATENT DOCUMENTS

| DE | 11 2011 102 143 | 5/2013 |
| EP | 1 832 851 | 9/2007 |

(Continued)

OTHER PUBLICATIONS

Chinese Office Action dated Dec. 26, 2019 in corresponding Chinese Patent Application No. 201780018897.2 with English translation of Search Report.

(Continued)

*Primary Examiner* — William Kelleher
*Assistant Examiner* — Gregory T Prather
(74) *Attorney, Agent, or Firm* — Wenderoth, Lind & Ponack, L.L.P.

(57) ABSTRACT

Provided is an electric actuator (1), including: a motor (10); a motor case (11) configured to accommodates the motor (10); and a motion conversion mechanism (22) configured to convert a rotary motion generated through drive by the motor (10) into a linear motion in a direction parallel to an output shaft (10*a*) of the motor (10). The motion conversion mechanism (22) includes a movable part (22, which is arranged in parallel with the output shaft (10*a*) and is configured to perform the linear motion. The movable part (22) and the motor (10) overlap one another in a radial direction of the motor (10). A sensor target (73) is arranged in the moveable part 22, and a non-contact sensor (70)

(Continued)

configured to detect a position of the sensor target (73) in a linear motion direction in a non-contact manner is arranged in the motor case (11).

18 Claims, 15 Drawing Sheets

(51) Int. Cl.
| | |
|---|---|
| H02K 7/06 | (2006.01) |
| G01B 7/00 | (2006.01) |
| F16H 25/24 | (2006.01) |
| H02K 11/215 | (2016.01) |
| F16D 3/84 | (2006.01) |
| F16H 25/22 | (2006.01) |
| F16H 57/02 | (2012.01) |
| G01D 5/14 | (2006.01) |
| H02K 5/10 | (2006.01) |

(52) U.S. Cl.
CPC ..... *F16H 25/2015* (2013.01); *F16H 25/2219* (2013.01); *F16H 25/24* (2013.01); *F16H 25/2418* (2013.01); *F16H 57/02* (2013.01); *G01B 7/00* (2013.01); *G01D 5/145* (2013.01); *H02K 5/10* (2013.01); *H02K 7/06* (2013.01); *H02K 11/215* (2016.01); *F16H 2025/2031* (2013.01); *F16H 2025/2081* (2013.01); *F16H 2057/02034* (2013.01)

(56) References Cited

U.S. PATENT DOCUMENTS

| | | | | |
|---|---|---|---|---|
| 7,490,699 | B2* | 2/2009 | Gil | B60T 7/107 |
| | | | | 188/1.11 R |
| 10,316,945 | B2* | 6/2019 | Olsson | A61G 7/1017 |
| 10,746,297 | B2* | 8/2020 | Li | F16H 57/039 |
| 10,865,861 | B2* | 12/2020 | Matsuto | F16H 25/24 |
| 2008/0157490 | A1* | 7/2008 | Hakui | B60G 7/008 |
| | | | | 280/5.521 |
| 2008/0157497 | A1* | 7/2008 | Terada | B62D 7/146 |
| | | | | 280/124.1 |
| 2008/0223160 | A1* | 9/2008 | Yamaguchi | B60G 7/006 |
| | | | | 74/89.23 |
| 2009/0247364 | A1* | 10/2009 | Sano | F16H 25/2021 |
| | | | | 477/197 |
| 2010/0019465 | A1* | 1/2010 | Yuta | B62D 17/00 |
| | | | | 280/86.758 |
| 2010/0315031 | A1* | 12/2010 | Jensen | F16H 25/2015 |
| | | | | 318/627 |
| 2012/0227524 | A1* | 9/2012 | Takahashi | H02K 11/215 |
| | | | | 74/89.34 |
| 2013/0112022 | A1* | 5/2013 | Shimizu | H02K 11/215 |
| | | | | 74/89.34 |
| 2014/0298980 | A1* | 10/2014 | Cyren | F16H 25/20 |
| | | | | 91/41 |
| 2016/0114098 | A1* | 4/2016 | Gao | F16H 25/20 |
| | | | | 604/67 |
| 2016/0167700 | A1* | 6/2016 | Fujita | B62D 5/0418 |
| | | | | 180/444 |
| 2017/0009834 | A1* | 1/2017 | Masuda | F16D 66/021 |
| 2018/0187759 | A1* | 7/2018 | Smith | H02P 29/032 |
| 2018/0259050 | A1* | 9/2018 | Gnebner | F16H 48/34 |
| 2019/0078671 | A1* | 3/2019 | Matsuto | F16H 25/24 |
| 2019/0097492 | A1* | 3/2019 | Matsuto | B62D 5/0403 |
| 2019/0390751 | A1* | 12/2019 | Sorensen | F16H 25/2015 |
| 2020/0052550 | A1* | 2/2020 | Shimizu | F16H 25/20 |
| 2020/0313508 | A1* | 10/2020 | Matsuto | H02K 11/33 |

FOREIGN PATENT DOCUMENTS

| | | |
|---|---|---|
| JP | 52-40904 | 9/1977 |
| JP | 05-055753 | 7/1993 |
| JP | 2000-2309 | 1/2000 |
| JP | 2001-124171 | 5/2001 |
| JP | 2002-372116 | 12/2002 |
| JP | 3736238 | 1/2006 |
| JP | 2008-274971 | 11/2008 |
| JP | 4253017 | 4/2009 |
| JP | 4804843 | 11/2011 |
| JP | 5243018 | 7/2013 |
| JP | 5417132 | 2/2014 |
| JP | 2015-187483 | 10/2015 |

OTHER PUBLICATIONS

Extended European Search Report dated Nov. 12, 2019 in corresponding European Patent Application No. 17774829.0.
International Preliminary Report on Patentability and Written Opinion of the International Searching Authority dated Oct. 2, 2018 in International (PCT) Application No. PCT/JP2017/012195.
Japanese Notice of Reasons for Refusal dated Dec. 16, 2019 in corresponding Japanese Patent Application No. 2016-069093 with English translation.
International Search Report dated May 23, 2017 in International (PCT) Application No. PCT/JP2017/012195.

* cited by examiner

ELECTRIC ACTUATOR

TECHNICAL FIELD

The present invention relates to an electric actuator.

BACKGROUND ART

In recent years, electrification of automobiles and the like has been promoted for the purpose of power saving and reduction in fuel consumption. For example, a system for operating an automatic transmission, a brake, a steering wheel, and the like of the automobile with use of power of an electric motor such as a motor has been developed and brought to the market. As an electric actuator for use in such an application, there has been known an electric actuator employing a ball screw mechanism configured to convert a rotary motion generated through drive by a motor into a motion in a linear direction (see Patent Literature 1).

Moreover, in the actuator of this type, it is important to control a stroke amount or a position in a stroke direction of an operation part (namely, an actuator head) configured to output the linear motion. Thus, as means for detecting the stroke amount or the position in the stroke direction, for example, there has been proposed a method of coupling a link mechanism that includes a plurality of link members to a movable part (namely, a stroke shaft) performing the linear motion, and detecting an angle of the link members to detect a position of the movable part (see Patent Literature 2). There has also been proposed, as an alternative, a method of detecting a rotation angle of the motor (see Patent Literature 3), and calculating the stroke amount or the positon in the stroke direction of the actuator head based on the detected rotation angle.

CITATION LIST

Patent Literature 1: JP 5243018 B2
Patent Literature 2: JP 5417132 B2
Patent Literature 3: JP 2015-187483 A

SUMMARY OF INVENTION

Technical Problem

Through the detection of the angle of the link coupled to the movable part in such a manner, the position information on the movable part can directly be acquired compared to, for example, the case in which the rotation angle of the motor is used to calculate the position of the movable part. Thus, a problem such as a backlash of component parts is less likely to occur, and an increase in detection precision is expected. However, in the position detection device using the link mechanism, the number of parts required for the position detection increases. The increase in the number of parts leads to an increase in size of the product. Therefore, in consideration of series production of the electric actuator of this type for the above-mentioned reason, the position detection device using the link mechanism is not always considered as an appropriate configuration.

Moreover, even the position detection device using the link mechanism is not free from the backlash of the link members, and it is thus still difficult to acquire a sufficient position detection precision.

Moreover, in the above-mentioned electric actuator, the actuator head is generally provided on one end side in the longitudinal direction of the movable part performing the linear motion, and the movable part (mainly a motion conversion mechanism) thus tends to be exposed to the outside. Therefore, it is required to, for example, cover the movable part and a periphery thereof, to thereby prevent foreign substances from entering inside the movable part.

Meanwhile, in the related-art method of calculating the stroke amount of the actuator head based on the rotation angle of the motor, a difference between an actual stroke amount and the calculated stroke amount inevitably occurs due to influence of, for example, backlashes of various component parts relating to the motion conversion. In order to solve this problem, for example, it is conceivable to employ methods of using, for example, a laser sensor and a sensor of contact type to directly detect that the actuator head or the movable part in which the actuator head is formed reaches a predetermined position. However, in these methods, it is required to use, for example, laser and a contact element to sense an exposed portion of the head or the movable part. With such a configuration, it is difficult to cover between the movable part and the periphery thereof, and there thus poses such a problem that it is difficult to secure sealability for the movable part.

In view of the above-mentioned circumstances, the present invention has a first technical object of enabling highly precise detection of the position of the actuator head while reducing the number of parts compared to the related-art to achieve the size reduction, to thereby achieve the series production of the electric actuator at a low cost.

Moreover, in view of the above-mentioned circumstances, the present invention has a second technical object of providing an electric actuator capable of highly precisely detecting the stroke amount and the position in the stroke direction, while the sealability for the movable part is secured.

Solution to Problem

The first technical object is achieved by an electric actuator of a first invention of the present application. Specifically, there is provided an electric actuator, comprising: a motor; a motor case configured to accommodate the motor; and a motion conversion mechanism configured to convert a rotary motion generated through drive by the motor into a linear motion in a direction parallel to an output shaft of the motor, wherein the motion conversion mechanism comprises a movable part, which is arranged in parallel with the output shaft and is configured to performs the linear motion, wherein the movable part and the motor overlap one another in a radial direction of the motor, wherein a sensor target is arranged in the moveable part, and wherein a non-contact sensor configured to detect a position of the sensor target in a linear motion direction in a non-contact manner is arranged in the motor case.

As described above, according to the first invention of the present application, the movable part and the motor are arranged at the positions overlapping one another in the radial direction of the motor so that the non-contact sensor can be arranged in the motor case. Thus, it is not required that a dedicated case for mounting the non-contact sensor be manufactured independently of the existing cases. Therefore, the configuration capable of detecting the position of the movable part without increasing the number of the cases can be provided. Moreover, a position detection device comprises the sensor target arranged in the movable part and the non-contact sensor configured to detect the position of the sensor target in the linear motion direction in the non-contact manner. Thus, the position of the movable part can be detected more directly than in the related-art configuration, and, with this, the position detection precision can be increased. Moreover, with the position detection device comprising the sensor target and the non-contact sensor as described above, the number of the parts directly relating to the position detection can be reduced, thereby being capable of achieving the size reduction of the position detection device. Thus, this configuration is preferred for downsizing of the product (electric actuator) as well as for the series production. As a matter of course, the reduction in number of parts generally leads to the cost reduction, and this configuration is also preferred in terms of cost.

In the electric actuator according to the first invention of the present application, the non-contact sensor may be arranged between the motor and the movable part.

When the non-contact sensor is arranged in a direction orthogonal to a direction facing the motor with respect to the movable part, an exterior dimension in the stroke direction may increase by an amount of an arrangement space of the sensor additionally provided in the product (electric actuator). In contrast, the electric actuator according to the first invention of the present application has a configuration in which the output shaft of the motor and the movable part are parallel with one another, and in which the motor and the actuator head are positioned on the same side in the longitudinal direction of the movable part. Thus, formation of the space for arranging the non-contact sensor is promoted between the motor and the movable part. Thus, through arrangement of the non-contact sensor at the above-mentioned position, the position of the movable part can be detected while an increase in exterior dimension of the electric actuator is suppressed as much as possible.

In the electric actuator according to the first invention of the present application, a shaft cover configured to cover a periphery of the movable part is provided integrally with the motor case, and a retreating portion in which an outer peripheral surface of the motor case inwardly retreats compared to a periphery of the retreating portion is formed between a case main body out of the motor case, which is configured to accommodate the motor, and the shaft cover, and the non-contact sensor is mounted to the retreating portion.

With such configuration of the motor case and through the arrangement of the non-contact sensor, while a space between the movable part and the shaft cover is reduced as much as possible, and an appropriate distance to the sensor target is maintained, the position of the movable part can be detected. Thus, while the size reduction of the product is achieved, the position of the movable part can highly precisely be detected.

In the electric actuator according the first invention of the present application, both of the case main body and the shaft cover may have a cylindrical shape, and may be coupled to one another while outer peripheral surfaces of the case main body and the shaft cover are in contact with one another, and the non-contact sensor may be mounted in a vicinity of a coupling portion to the motor case out of the shaft cover.

With the case main body, which is configured to directly accommodate the motor, and the shaft cover both having the cylindrical shape, an unnecessary space is further reduced, thereby being capable of achieving a further size reduction of the product. Moreover, in this case, through mounting of the non-contact sensor in the vicinity of the coupling portion between the case main body and the shaft cover, the non-contact sensor can be mounted to the electric actuator without causing an increase in dimension of the product.

Moreover, in this case, in the electric actuator according to the first invention of the present application, an opening portion may be formed in a vicinity of a coupling portion to the case main body out of the shaft cover, and a sensor base in a state in which the non-contact sensor is arranged may be mounted to the opening portion.

With such a configuration, the sensor base is mounted to the shaft cover from a state in which the shaft cover, together with the motor, is assembled to other cases, thereby being capable of arranging the non-contact sensor to a predetermined position with respect to the sensor target. With this, the assembly of the non-contact sensor can be facilitated. Moreover, through mounting of the non-contact sensor to the open portion, the non-contact sensor can be mounted to the motor case while the non-contact sensor is covered with the opening portion and the sensor base. Thus, the non-contact sensor can easily be mounted to the motor case from the outside while the non-contact sensor is protected.

The second technical object is achieved by an electric actuator of a second invention of the present application. Specifically, there is provided an electric actuator, comprising: a motor; and a motion conversion mechanism, which is configured to convert a rotary motion generated through drive by the motor to a linear motion in a direction parallel to an output shaft of the motor, wherein the motion conversion mechanism comprises a movable part, which is arranged in parallel with the output shaft and is configured to perform the linear motion, wherein a boot made of rubber or resin is arranged between the movable part and a fixed system around the movable part, and a magnet is arranged in a portion of the movable part covered with the boot, and wherein a magnetic sensor configured to detect a position of the magnet in a linear motion direction is arranged around the boot. The fixed system herein corresponds to an element which is not changed in positional relationship with respect to external elements to which the electric actuator is mounted or fixed out of elements forming the electric actuator, or a group of such elements.

As described above, in the second invention of the present application, the boot is arranged between the movable part and the fixed system therearound. Thus, the boot can be used to prevent foreign substances from entering inside the motion conversion mechanism. Moreover, through arrangement of the magnet in the portion of the movable part covered with the boot, and arrangement of the magnetic sensor around the boot, the boot is present between the sensor and the sensor target. However, the boot is made of resin or rubber, and hence the detection of a magnetic field by the magnetic sensor is not obstructed. Therefore, the position of the movable part in the linear motion direction can accurately be detected while the inside of the motion conversion mechanism is sealed by the boot. Moreover, through arrangement of the magnet in the portion covered with the boot, degradation and damage due to exposure of the magnet to the external air can be prevented as much as possible. Thus, a highly precise position detection function can thus be provided for a long period.

In the electric actuator according to the second invention of the present application, the magnet may be mounted to the movable part through intermediation of a magnet holder configured to hold the magnet, and the magnetic sensor may be mounted to a boot cover configured to cover a periphery of the boot, and both of the magnet holder and the boot cover may be made of a nonmagnetic material.

With such a configuration, a fear of causing disturbance of a magnetic field generated around at least the magnet due to influence from the magnet holder is reduced. Moreover, a fear of causing disturbance of a magnetic field to be detected by the magnetic sensor due to influence from the boot cover is also reduced. Thus, a change in the magnetic field (such as magnetic flux density) can more accurately be detected by the magnetic sensor, and hence the detection precision can be further increased or stabilized.

Moreover, in the electric actuator according to the second invention of the present application, the magnetic sensor may be a Hall IC. The Hall IC mentioned herein includes a linear Hall IC configured to linearly output a voltage.

As the magnetic sensor, any suitable sensor may be used as long as the sensor can detect the magnetic field generated around the magnet to detect the position of the magnet in the linear motion direction. The Hall IC, in particular, out of such sensors can precisely detect a change in the magnetic field while having a compact configuration. Thus, an increase in position detection precision can thus be expected.

In the electric actuator according to the second invention of the present application, a magnetization direction of the magnet in the state in which the magnet is mounted to the movable part matches the linear motion direction of the movable part.

Through matching of the magnetization direction of the magnet with the linear motion direction of the movable part in such a manner, a state in which more magnetic lines of force are generated around the movable part than on both end sides of the movable part in the stroke direction is brought about. On this occasion, the magnetic sensor is arranged on the boot cover configured to cover the boot. Thus, the magnetic sensor is considered to be arranged around the movable part in terms of a relation with the movable part. As a result, a large change in direction of the magnetic field detected by the magnetic sensor tends to appear. Thus, a detection performance for the change in magnetic field by the magnetic sensor can be increased, and the position of the magnet in the linear motion direction can more precisely be detected.

In the electric actuator according to the second invention of the present application, a magnetic shielding plate is arranged at least between the motor and the magnetic sensor out of a periphery of the motor.

The motor internally comprises magnets. Therefore, a predetermined magnetic field is formed around the motor. Meanwhile, the electric actuator according to the present invention has a configuration in which the output shaft of the motor and the movable part serving as an output part of the motion conversion mechanism are arranged in parallel with one another, and hence a distance between the motor and the movable part is inevitably reduced when the design intends to downsize the electric actuator. The magnetic sensor is arranged around the movable part, and hence a distance between the magnetic sensor and the motor is thus also reduced. In this state, the magnetic field formed around the motor influences the magnetic field originally intended to be detected by the magnetic sensor, and the accurate position detection may thus be difficult. Thus, in the second invention of the present application, the magnetic shielding plate is arranged around the motor, which is the source of generating the one magnetic field. Moreover, the magnetic shielding plate is arranged at least between the motor and the magnetic sensor. Through the arrangement of the magnetic shielding plate in such a manner, the magnetic field generated from the motor being the generation source is shielded. Thus, only the magnetic field originally intended to be detected (the magnetic field generated by the magnet forming, together with the magnetic sensor, the magnetic detection device) can accurately be detected, thereby being capable of precisely detecting the position of the movable part.

Moreover, in this case, in the electric actuator according to the second invention of the present application, the magnetic shielding plate may have a cylindrical shape, and may be arranged between the motor and a motor case configured to accommodate the motor.

With the magnetic shielding plate having the above-mentioned configuration, the motor is in a state in which the entire periphery of the motor is covered with the magnetic shielding plate. In this case, the magnetic shielding plate serves as a type of a yoke capable of forming, together with the motor, a closed magnetic circuit, and a state in which the magnetic field (specifically, such as magnetic flux) generated by the magnets inside the motor leaks to the outside of the motor can be prevented as much as possible. Thus, the influence of the magnetic field exerted on the magnetic sensor can more reliably be eliminated, thereby being capable of achieving more precise position detection.

Advantageous Effects of Invention

As described above, according to the first invention of the present application, highly precise detection of the position of the actuator head is enabled while reducing the number of parts compared to the related-art to achieve the size reduction, to thereby achieve the series production of the electric actuator at a low cost.

Moreover, as described above, according to the second invention of the present application, there can be provided an electric actuator capable of simply and highly precisely detecting the stroke amount and the position in the stroke direction, while the sealability for the movable part is increased.

DESCRIPTION OF EMBODIMENTS

Now, description is made of a first invention and a second invention of the present application with reference to the accompanying drawings. In the respective drawings for illustrating the present invention, components such as members and component parts having the same functions or shapes are denoted by the same reference symbols as long as the components can be distinguished, and description thereof is therefore omitted after the description is made once.

Figure 1:
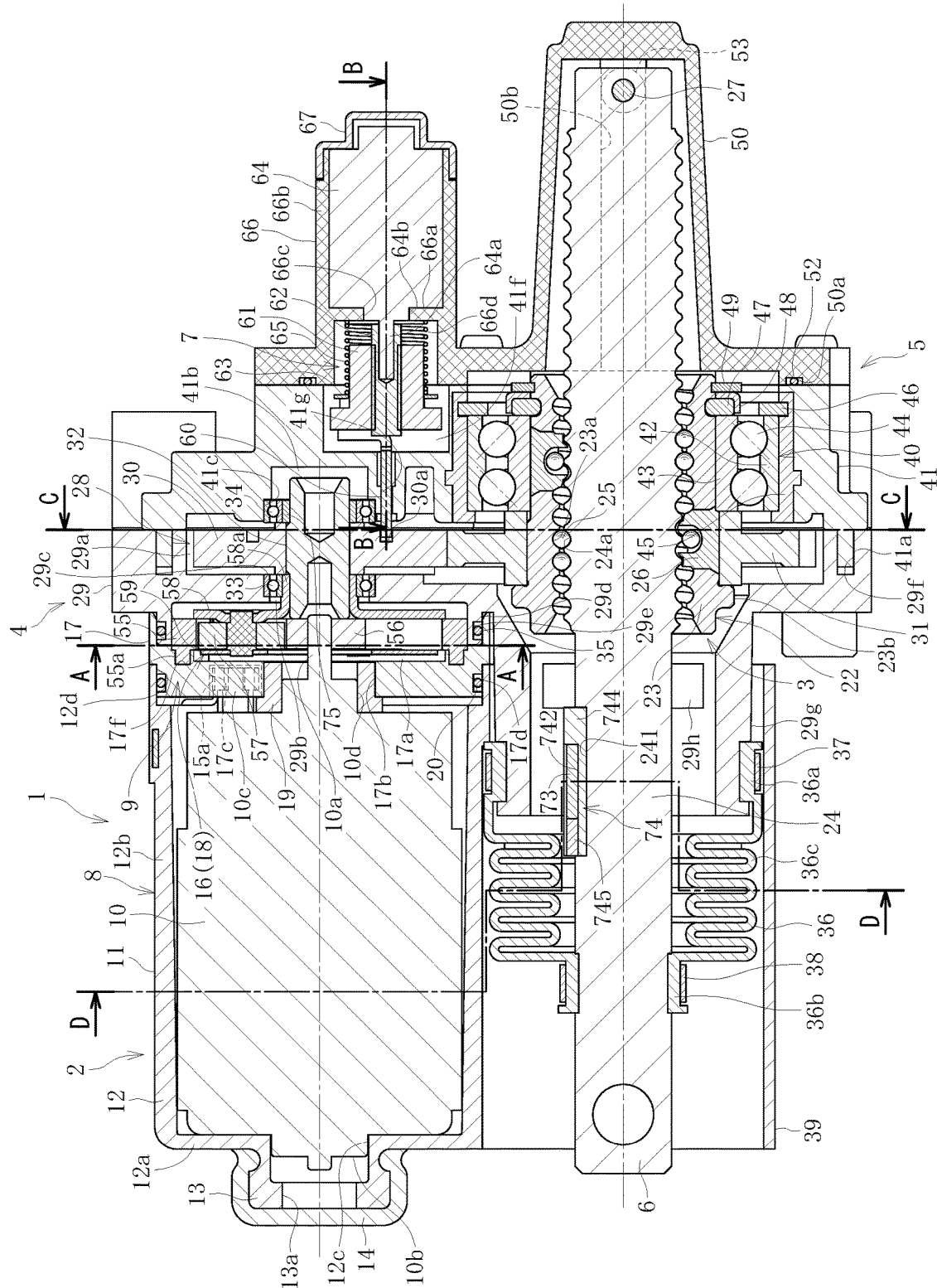
FIG. 1 is a vertical sectional view of an electric actuator according to one embodiment of a first invention and a second invention of the present application.
Figure 2:
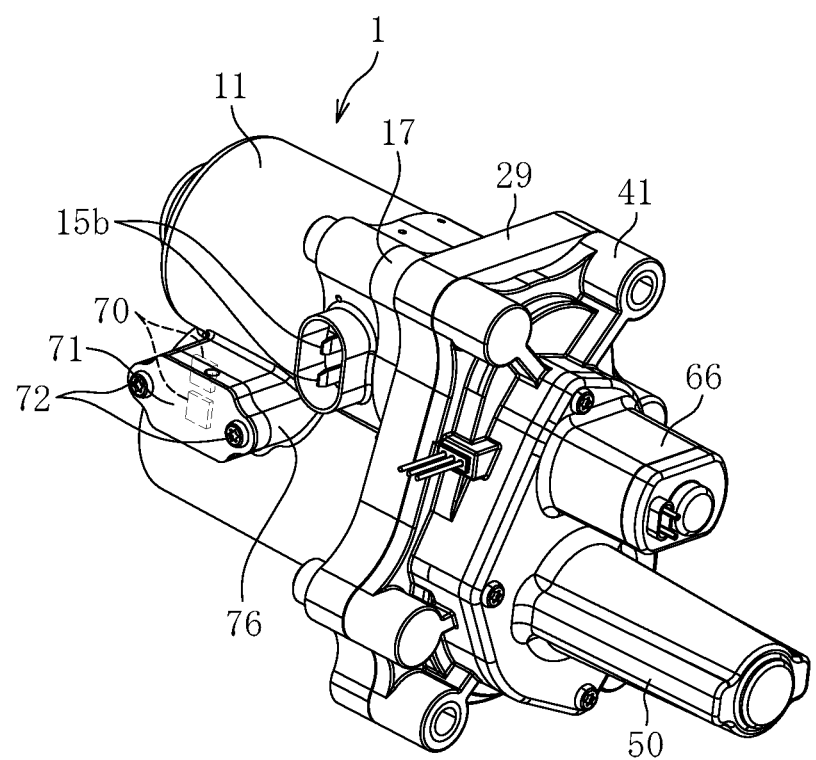
FIG. 2 is an external perspective view of the electric actuator.
Figure 3:
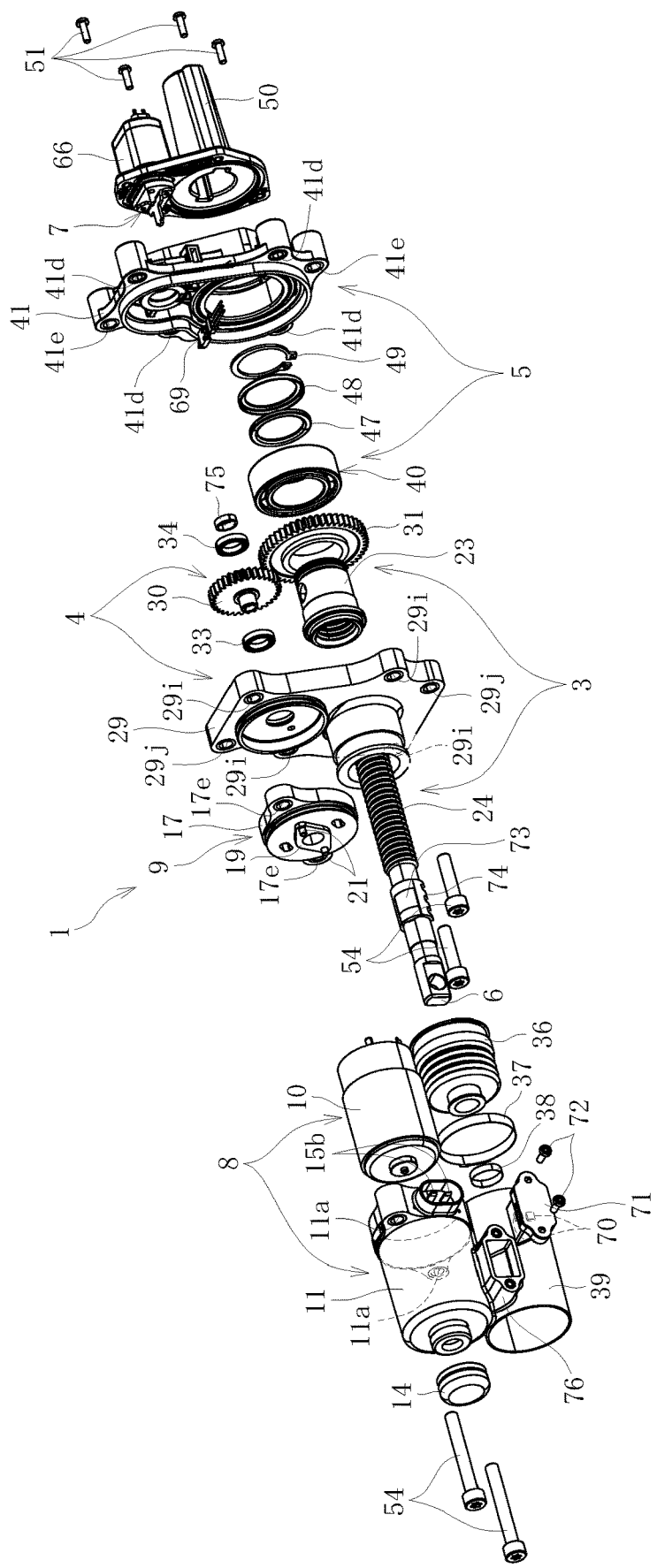
FIG. 3 is an exploded perspective view of the electric actuator.

FIG. 1 is a vertical sectional view for illustrating an assembled state of an electric actuator according to one embodiment of the first invention and the second invention of the present application. FIG. 2 is an external perspective view for illustrating the assembled state of the electric actuator. FIG. 3 is an exploded perspective view of the electric actuator.

As illustrated in FIG. 1, an electric actuator 1 of this embodiment comprises a drive part 2, a motion conversion mechanism part 3, a driving force transmission part 4, a motion-conversion-mechanism support part 5, an operation part 6, and a lock mechanism part 7. The drive part 2 is configured to generate a driving force. The motion conversion mechanism part 3 is configured to convert a rotary motion from the drive part 2 into a linear motion. The driving force transmission part 4 is configured to transmit the driving force from the drive part 2 to the motion conversion mechanism part 3. The motion-conversion-mechanism support part 5 is configured to support the motion conversion mechanism part 3. The operation part 6 is configured to output the motion of the motion conversion mechanism part 3. The lock mechanism part 7 is configured to prevent the motion conversion mechanism part from driving. The drive part 2 comprises a motor part 8 and a speed reduction mechanism part 9.

Each of the parts forming the electric actuator 1 has a case. Component parts are accommodated in each of the cases. Specifically, the motor part 8 comprises a motor case 11 configured to accommodate a motor configured to generate a driving force (driving motor 10). The speed reduction mechanism part 9 comprises a speed reduction gear case 17 configured to accommodate a speed reduction gear mechanism 16. Moreover, the driving force transmission part 4 comprises a transmission gear case 29 configured to accommodate a transmission gear mechanism 28. The motion-conversion-mechanism support part 5 comprises a bearing case 41 configured to accommodate a support bearing 40. In this embodiment, respective pairs of the motor part 8 and the speed reduction mechanism part 9, the speed reduction mechanism part 9 and the driving force transmission part 4, and the driving force transmission part 4 and the motion-conversion-mechanism support part 5 are configured to be capable of being coupled to and decoupled from one another while the pairs are accommodated in the cases. Further, a shaft case 50 is configured to be capable of being coupled to and decoupled from the bearing case 41. Now, description is made of detailed configurations of the respective parts forming the electric actuator 1.

The motor part 8 mainly comprises the driving motor (for example, DC motor) 10 and the motor case 11. The driving motor 10 is configured to drive the motion conversion mechanism part 3. The motor case 11 is configured to accommodate the driving motor 10. The motor case 11 comprises a case main body 12 and a projecting portion 13. The case main body 12 has a bottomed cylindrical shape, and is configured to accommodate the driving motor 10 therein. The projecting portion 13 projects from a bottom portion 12a of the case main body 12 to the outside. The projecting portion 13 has a hole portion 13a which communicates to an internal space of the case main body 12. The hole portion 13a is sealed by a seal member 14 that is made of resin and covers an outer surface of the projecting portion 13.

The driving motor 10 is inserted from an opening portion 12d of the case main body 12 into an inside of the case main body 12. At this time, an end surface of the driving motor 10 on an inner side in an insertion direction is held in abutment against the bottom portion 12a of the case main body 12. Moreover, a fitting hole 12c is formed in a center portion of the bottom portion 12a. A projection 10b of the driving motor 10 in the inner side in the insertion direction is fitted to the fitting hole 12c, thereby being capable of preventing the situation in which a rear end (left end portion in FIG. 1) of an output shaft 10a of the driving motor 10 projecting from the projection 10b interferes with the bottom portion 12a of the motor case 11. Further, an inner peripheral surface of a peripheral wall portion 12b of the case main body 12 is reduced in diameter in a tapered shape from the opening portion 12d side toward the bottom portion 12a side. When the driving motor 10 is inserted into the case main body 12, an outer peripheral surface of the driving motor 10 on the inner side in the insertion direction comes into contact with the inner peripheral surface of the peripheral wall portion 12b. With this configuration, the driving motor 10 is supported through the contact with the inner peripheral surface of the case main body 12 and the fitting to the fitting hole 12c under the state in which the driving motor 10 is accommodated in the case main body 12.

Figure 4:
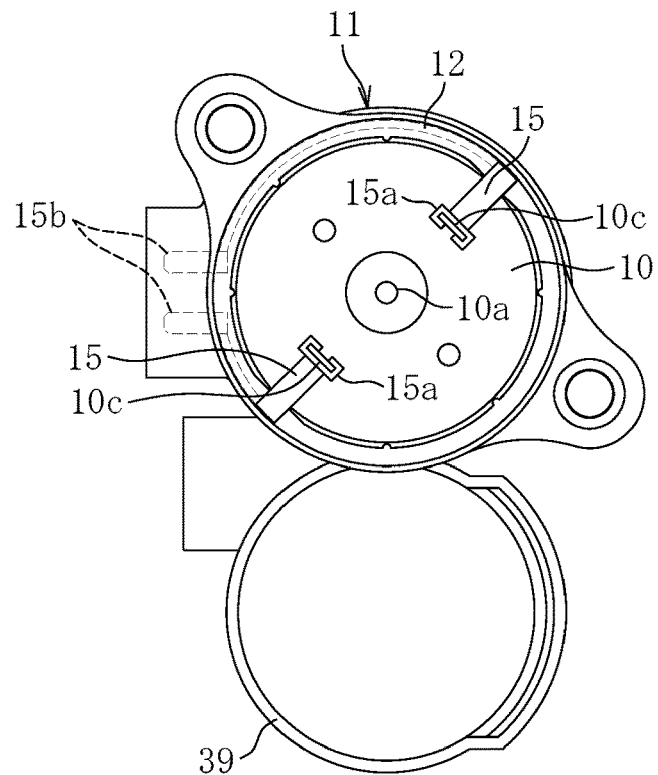
FIG. 4 is a view of a motor case as seen from an opening portion side.

Moreover, as illustrated in FIG. 4, which is a view of the motor case 11 as seen from the opening portion 12d side, a pair of bus bars 15 configured to connect the driving motor 10 to a power supply is mounted to the case main body 12. One end portion 15a of each of the bus bars 15 is connected to a motor terminal 10c through crimping, and another end portion 15b is exposed from the case main body 12 to the outside (see FIG. 2 and FIG. 3). The another end portions 15b of the bus bars 15 exposed to the outside are connected to the power supply.

As illustrated in FIG. 1, the speed reduction mechanism part 9 mainly comprises the speed reduction gear mechanism 16 and the speed reduction gear case 17. The speed reduction gear mechanism 16 is configured to reduce the speed of the driving force of the driving motor 10 and output the driving force. The speed reduction gear case 17 is configured to accommodate the speed reduction gear mechanism 16. The speed reduction gear mechanism 16 is formed of a planetary-gear speed reduction mechanism 18 comprising a plurality of gears and the like. A detailed configuration of the planetary-gear speed reduction mechanism 18 is described later.

The speed reduction gear case 17 has an accommodating recessed portion 17a configured to accommodate the planetary-gear speed reduction mechanism 18 from a side opposite to the driving motor 10 side. Moreover, the speed reduction gear case 17 is formed so as to enable a motor adaptor 19 serving as a motor mounting member to be mounted thereto. The motor adaptor 19 is a tubular member, and the driving motor 10 is fitted (internally fitted) to the motor adaptor 19 through insertion of a projection 10d of the driving motor 10 on an output side (right side in FIG. 1) into and fitted to an inner peripheral surface thereof. A fitting hole 17b to which the motor adaptor 19 is fitted is formed in the speed reduction gear case 17. The motor adaptor 19 is mounted to the speed reduction gear case 17 through insertion of the motor adaptor 19 from the driving motor 10 side into the fitting hole 17b.

The speed reduction gear case 17 is formed so as to be capable of being fitted to the motor case 11, and is also formed so as be capable of being fitted to a transmission gear case 29, descried later, and arranged on an opposite side of the motor case 11. A portion of the speed reduction gear case 17 arranged on the motor case 11 side is internally fitted to the opening portion 12d side of the motor case 11. A portion of the speed reduction gear case 17 arranged on the transmission gear case 29 side is externally fitted to the transmission gear case 29. Moreover, the speed reduction gear case 17 is fastened to the driving motor 10 through bolts 21 (see FIG. 3 and FIG. 6) together with the motor adaptor 19 while being fitted to the motor case 11. Recessed portions 17c are formed on the driving motor 10 side of the speed reduction gear case 17 in order to prevent interference of the motor terminals 10c projecting from the driving motor 10 and the end portions 15a of the bus bars 15 crimped to the motor terminals 10c with the speed reduction gear case 17 in a state in which the speed reduction gear case 17 and the motor case 11 are fitted to one another. Moreover, a mounting groove 17d configured to receive an O-ring 20 is formed on an outer peripheral surface, which has a small diameter, and to be fitted to an inner peripheral surface of the motor case 11, out of an outer peripheral surface of the speed reduction gear case 17.

In this embodiment, the motion conversion mechanism part 3 is formed of a ball screw 22. The ball screw 22 comprises a ball screw nut 23, a ball screw shaft 24, a large number of balls 25, and deflectors 26. The ball screw nut 23 serves as a rotary body. The ball screw shaft 24 serves as a movable part performing a linear motion. The deflectors 26 serve as circulation members. Spiral grooves 23a and 24a are respectively formed in an inner peripheral surface of the ball screw nut 23 and an outer peripheral surface of the ball screw shaft 24. The balls 25 are loaded between both of the spiral grooves 23a and 24a, and the deflectors 26 are assembled therebetween. With this configuration, the balls 25 in two rows circulate.

The ball screw nut 23 receives the driving force generated by the driving motor 10, to thereby rotate in a forward direction or a backward direction. Meanwhile, the rotation of the ball screw shaft 24 is restricted by a pin 27 that is provided on a rear end portion (right end portion in FIG. 1) thereof and serves as a rotation restriction member. Therefore, when the ball screw nut 23 rotates, the balls 25 circulate along both the spiral grooves 23a and 24a and the deflectors 26, and the ball screw shaft 24 performs the linear motion along the axial direction. FIG. 1 is a view for illustrating a state in which the ball screw shaft 24 is arranged at an initial position given when the ball screw shaft 24 retreats most to the right side of FIG. 1. Moreover, the ball screw shaft 24 is arranged in parallel with the output shaft 10a of the driving motor 10. The rotary motion transmitted from the driving motor 10 through intermediation of the driving force transmission part 4 is converted into a linear motion in the axial direction parallel to the output shaft 10a by the ball screw shaft 24. In this case, a distal end portion (left end portion in FIG. 1) of the ball screw shaft 24 in an advancing direction functions as the operation part (actuator head) 6 configured to operate an object device to be operated The driving force transmission part 4 mainly comprises the transmission gear mechanism 28 and the transmission gear case 29. The transmission gear mechanism 28 is configured to transmit the driving force and the rotary motion from the driving motor 10 of the drive part 2 to the ball screw 22 forming the motion conversion mechanism part 3. The transmission gear case 29 is configured to accommodate the transmission gear mechanism 28. The transmission gear mechanism 28 comprises a drive gear 30 on a drive side, a driven gear 31 on a driven side meshing with the drive gear 30, and a gear boss 32.

A gear boss 32 is fitted to a rotation center portion of the drive gear 30 by, for example, press-fitting. The drive gear 30 is rotatably supported through intermediation of the gear boss 32 by two rolling bearings 33 and 34 mounted respectively to both the transmission gear case 29 and the bearing case 41 described later. Meanwhile, the driven gear 31 is fixed to the outer peripheral surface of the ball screw nut 23 through fitting such as press-fitting. When the driving force is transmitted from the driving motor 10 to the drive gear 30 through the planetary-gear speed reduction mechanism 18, the driving force is transmitted to the driven gear 31 through meshing between the drive gear 30 and the driven gear 31. With this, the driven gear 31 and the ball screw nut 23 integrally rotate, and the ball screw shaft 24 advances and retreats along a longitudinal direction thereof.

The transmission gear case 29 comprises an accommodating recessed portion 29a configured to accommodate the drive gear 30 and the driven gear 31 therein. Moreover, the transmission gear case 29 has an insertion hole 29b through which the gear boss 32 is inserted. On an inner peripheral surface of the insertion hole 29b, there is formed a bearing mounting surface 29c to which the one rolling bearing 33 configured to support the gear boss 32 is mounted. Moreover, the transmission gear case 29 comprises an annular projection 29d fitted to an inner peripheral surface of the speed reduction gear case 17. In an outer peripheral surface (fitting surface) of the annular projection 29d, there is formed a mounting groove 29e configured to mount an O ring 35. Moreover, in a surface of the transmission gear case 29 on the bearing case 41 side, there is formed a fitting recessed portion 29f in a groove form fitted to the bearing case 41.

Moreover, the transmission gear case 29 comprises a cylindrical portion 29g projecting toward a distal end portion side (left side in FIG. 1) of the ball screw shaft 24. The cylindrical portion 29g is a portion arranged so as to cover a periphery of the ball screw shaft 24 under a state in which the driven gear 31 is accommodated in the transmission gear case 29, and the ball screw 22 is assembled to the driven gear 31. A boot 36 configured to prevent foreign substances from entering the transmission gear case 29 is mounted between the cylindrical portion 29g and the ball screw shaft 24. In this case, the cylindrical portion 29g forms a fixed system of the electric actuator 1. The boot 36 is made of resin or rubber, and comprises a large-diameter end portion 36a, a small-diameter end portion 36b, and a bellows portion 36c, which connects the large-diameter end portion 36a and the small-diameter end portion 36b with one another, and extends or retreats in the axial direction. The large-diameter end portion 36a is fixed to a mounting portion of an outer peripheral surface of the cylindrical portion 29g by tightening a boot band 37. The small-diameter end portion 36b is fixed to a mounting portion of the outer peripheral surface of the ball screw shaft 24 by tightening a boot band 38. Moreover, the cylindrical portion 29g has a vent hole 29h which is configured to cause the air to communicate between an inside and an outside of the boot 36 when the boot 36 expands and contracts. Moreover, a boot cover 39 arranged around the boot 36 is provided integrally with the motor case 11. In this case, the boot cover 39 forms the fixed system of the electric actuator 1.

The motion-conversion-mechanism support part 5 mainly comprises the support bearing 40 and the bearing case 41. The support bearing 40 is configured to support the ball screw 22 being the motion conversion mechanism part 3. The bearing case 41 is configured to accommodate the support bearing 40. In this embodiment, the support bearing 40 is formed of a back-to-back double-row angular contact ball bearing comprising an outer ring 42, an inner ring 43, and balls 44 in a plurality of rows interposed therebetween as main components.

The support bearing 40 is accommodated in a sleeve 45 formed integrally with the bearing case 41, and is fixed through a snap ring 46 mounted to an inner peripheral surface of the sleeve 45. Moreover, the support bearing 40 is fixed by being press-fitted to an outer peripheral surface of the ball screw nut 23 at a position on a rear end side (right side in FIG. 1) of the ball screw shaft 24 with respect to the driven gear 31. A movement in the axial direction of the support bearing 40 and the driven gear 31 fixed to the outer peripheral surface of the ball screw nut 23 is restricted by a restriction projection 23b formed on the ball screw nut 23 on the driven gear 31 side and a restriction member 47 mounted on the support bearing 40 side. The restriction member 47 comprises a pair of semicircular members, and is mounted to the outer peripheral surface of the ball screw nut 23 while the semicircular members are combined in an annular form. Further, a pressing collar 48 and a snap ring 49 are mounted to the outer peripheral surface of the ball screw nut 23. The pressing collar 48 is configured to hold the restriction member 47. The snap ring 49 is configured to prevent the pressing collar 48 from falling off in the axial direction.

On the transmission gear case 29 side of the bearing case 41, there is formed a protruding portion 41a configured to be fitted to the fitting recessed portion 29f of the transmission gear case 29. Moreover, on the transmission gear case 29 side of the bearing case 41, there is formed a gear boss accommodating portion 41b configured to accommodate a part of the gear boss 32 projecting from the transmission gear case 29 under a state in which the bearing case 41 is fitted to the transmission gear case 29. On an inner peripheral surface of the gear boss accommodating portion 41b, there is formed a bearing mounting surface 41c which is configured to mount the rolling bearing 34 configured to support the gear boss 32.

On an opposite side of the bearing case 41 with respect to the transmission gear case 29 side, the shaft case 50 having a bottomed tubular shape configured to accommodate a rear end portion side (right end portion side in FIG. 1) of the ball screw shaft 24 is formed so as to be capable of being fastened through bolts 51 (see FIG. 3). In an abutment surface of the shaft case 50 against the bearing case 41, there is formed a mounting groove 50a configured to mount an O ring 52. Moreover, in an inner peripheral surface of the shaft case 50, guide grooves 50b into which both end portions of the pin 27 provided on the ball screw shaft 24 are formed so as to extend in the axial direction. A guide collar 53 is rotatably mounted to each of the both end portions of the pin 27. When the ball screw shaft 24 advances and retreats in the axial direction, the guide collars 53 move along the guide grooves 50b while rotating.

As illustrated in FIG. 3, bolt insertion holes 11a, 17e, 29i, and 41d for inserting bolts 54 configured to assemble and fasten the motor case 11, the speed reduction gear case 17, the transmission gear case 29, and the bearing case 41 are formed in outer peripheries of the respective cases in a radial direction. Further, through holes 29j and 41e configured to mount the assembled electric actuator 1 to an installation location are formed in the outer peripheries in the radial direction of both of the transmission gear case 29 and the bearing case 41.

Figure 5:
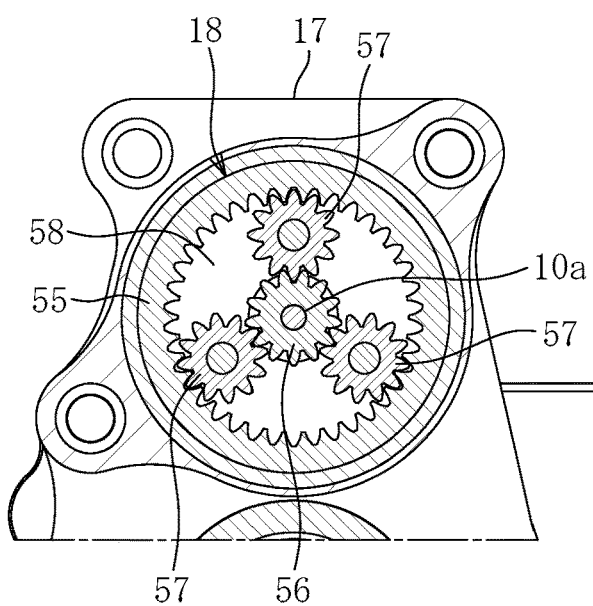
FIG. 5 is a transverse sectional view taken along the line A-A in FIG. 1 and seen from a direction indicated by the arrows A.
Figure 6:
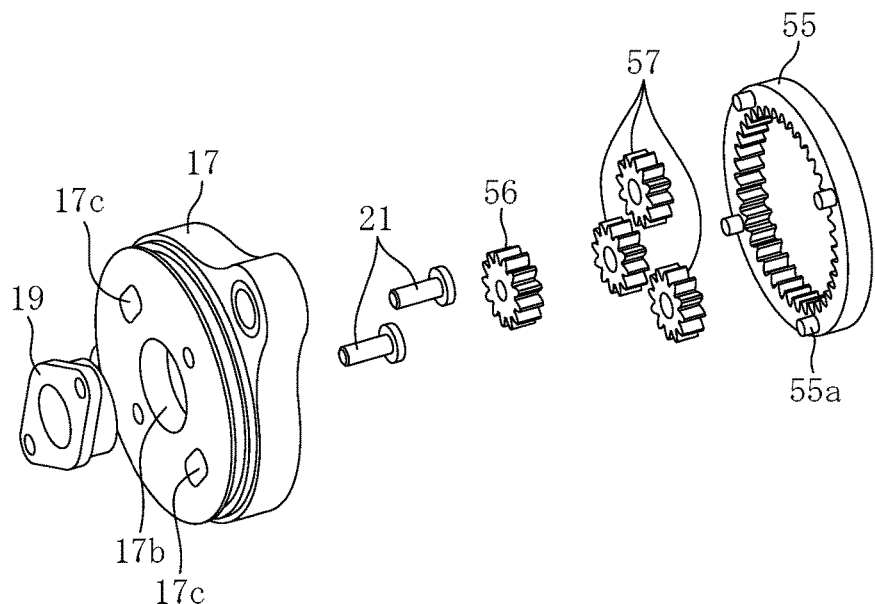
FIG. 6 is an exploded perspective view of a speed reduction mechanism part.

Now, description is made of the planetary-gear speed reduction mechanism 18 with reference to FIG. 1, FIG. 5, and FIG. 6. FIG. 5 is a transverse sectional view taken along the line A-A in FIG. 1 and seen from a direction indicated by the arrows A. FIG. 6 is an exploded perspective view of the planetary-gear speed reduction mechanism 18.

The planetary-gear speed reduction mechanism 18 comprises a ring gear 55, a sun gear 56, a plurality of planetary gears 57, a planetary gear carrier 58 (see FIG. 1), and planetary gear holders 59 (see FIG. 1). The ring gear 55 comprises a plurality of protrusions 55a projecting in the axial direction. Engagement recessed portions 17f as many as the protrusions 55a are formed in the accommodating recessed portion 17a of the speed reduction gear case 17 (see FIG. 1). Through assembly of the protrusions 55a of the ring gear 55 to the engagement recessed portions 17f of the speed reduction gear case 17 in a state in which the protrusions 55a and the engagement recessed portions 17f are in phase, the ring gear 55 is accommodated in the speed reduction gear case 17 in a state in which the rotation of the ring gear 55 is stopped.

The sun gear 56 is arranged at the center of the ring gear 55. The output shaft 10a of the driving motor 10 is press-fitted to the sun gear 56. Moreover, the respective planetary gears 57 are arranged between the ring gear 55 and the sun gear 56 so as to mesh with the ring gear 55 and the sun gear 56. The respective planetary gears 57 are rotatably supported by the planetary gear carrier 58 and the planetary gear holders 59. The planetary gear carrier 58 comprises a cylindrical portion 58a at its center portion. The cylindrical portion 58a is press-fitted between an outer peripheral surface of the gear boss 32 and an inner peripheral surface of the rolling bearing 33 as described above (see FIG. 1). An annular collar 75 is mounted between an inner peripheral surface of the another rolling bearing 34 and the outer peripheral surface of the gear boss 32.

In the planetary-gear speed reduction mechanism 18 having the configuration described above, when the driving motor 10 performs the rotational drive, the sun gear 56 coupled to the output shaft 10a of the driving motor 10 rotates, and, along with this rotation, the respective planetary gears 57 revolve along the ring gear 55 while rotating. With this, the rotary motion of the driving motor 10 is transmitted to the drive gear 30 while the speed of the rotary motion is reduced, and a rotation torque serving as the driving force is transmitted to the drive gear 30 in a state in which the rotation torque is increased. The large driving force transmitted to the ball screw shaft 24 as well as a high output of the ball screw shaft 24 are thus obtained through the transmission of the driving force through the planetary-gear speed reduction mechanism 18 in such a manner, and the downsizing of the driving motor 10 can thus be achieved.

Figure 7:
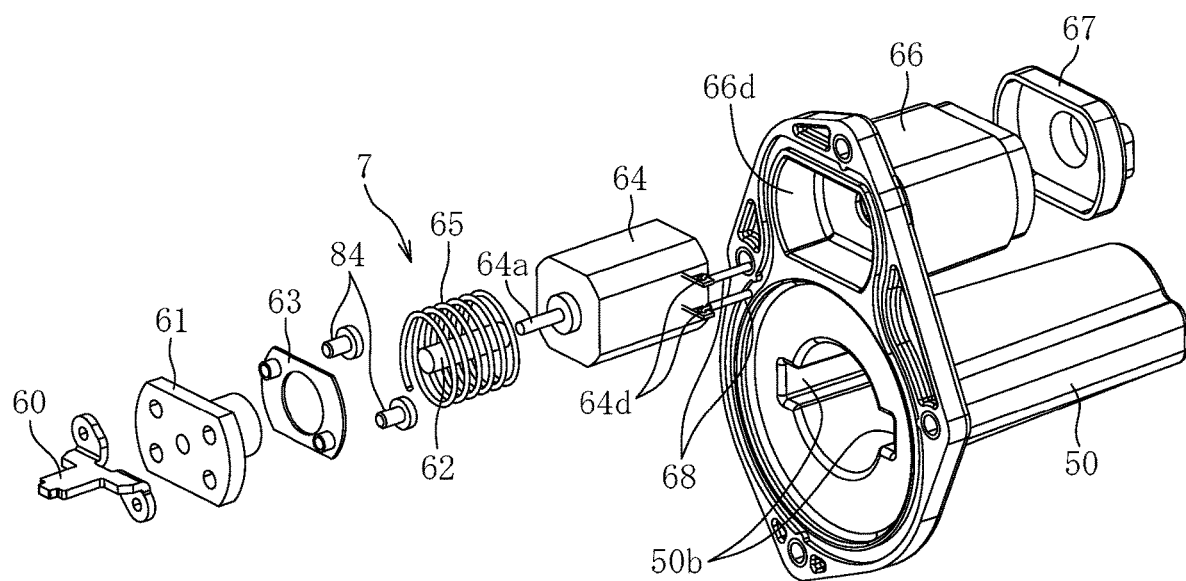
FIG. 7 is an exploded perspective view of a shaft case and a lock mechanism part mounted thereto.
Figure 8:
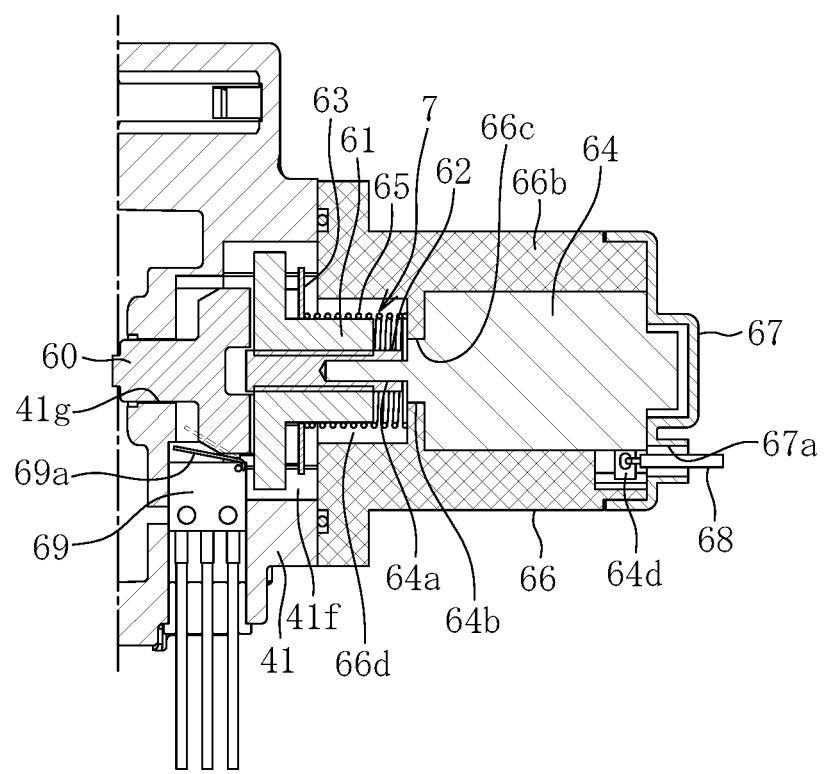
FIG. 8 is a transverse sectional view taken along the line B-B in FIG. 1 and seen from a direction indicated by the arrows B.

Next, detailed description is made of the lock mechanism part 7 with reference to FIG. 1, FIG. 7, and FIG. 8. FIG. 7 is an exploded perspective view of the shaft case 50 and the lock mechanism part 7 mounted thereto. FIG. 8 is a transverse sectional view taken along the line B-B in FIG. 1 and seen from a direction indicated by the arrows B.

The lock mechanism part 7 mainly comprises a lock member 60, a sliding screw nut 61, a sliding screw shaft 62, a lock-member fixation plate 63, a locking motor (for example, DC motor) 64 serving as a locking drive source, and a spring 65. The lock mechanism part 7 is to be assembled, for example, in the following procedure. First, the lock member 60 is fastened to the sliding screw nut 61 through intermediation of the lock-member fixation plate 63 with bolts 84 (see FIG. 7). Next, the locking motor 64 is accommodated in a holder portion 66 formed in the shaft case 50. The sliding screw shaft 62 is then mounted to an output shaft 64a of the locking motor 64 projecting from the holder portion 66. Then, the spring 65 is arranged on an outer periphery of the sliding screw shaft 62, and the sliding screw nut 61 having the lock member 60 mounted thereto is mounted to the sliding screw shaft 62 through thread engagement. In such a manner, the assembly of the lock mechanism part 7 is completed.

The holder portion 66 is formed into a bottomed tubular shape, and a cap 67 is mounted on an opposite side of a bottom portion 66a thereof. The locking motor 64 is held in abutment against the bottom portion 66a of the holder portion 66 and an inner surface of the cap 67 under a state in which the locking motor 64 is inserted into the holder portion 66 and the cap 67 is mounted. Moreover, under this state, a projection 64b of the locking motor 64 on an output side (left side in FIG. 1) is fitted to a fitting hole 66c formed in the bottom portion 66a of the holder portion 66. Both of an outer peripheral surface of the main body of the locking motor 64 and an inner peripheral surface of a peripheral wall portion 66b of the holder portion 66 are formed into the same shapes, which are not cylindrical. Thus, the rotation of the locking motor 64 is restricted through the insertion of the locking motor 64 into the peripheral wall portion 66b of the holder portion 66. Through accommodation of the locking motor 64 in the holder portion 66 in such a manner, the locking motor 64 is held by the holder portion 66, and the entire lock mechanism part 7 is held. Moreover, the cap 67 has a hole portion 67a configured to insert cables 68 connected to motor terminals 64d of the locking motor 64 (see FIG. 8). In this embodiment, the holder portion 66 is integrally formed in the shaft case 50 as a part thereof. However, as a matter of course, the holder portion 66 may be formed independently of the shaft case 50, and may be mounted to the bearing case 41.

Lock-mechanism accommodating recessed portions 66d and 41f are respectively formed in a portion of the shaft case 50 at which the holder portion 66 is formed and a portion of the bearing case 41 opposed thereto. A through hole 41g is formed in the lock-mechanism accommodating recessed portion 41f on the bearing case 41 side. As illustrated in FIG. 1, a part of the output shaft 64a of the locking motor 64, the sliding screw shaft 62, the sliding screw nut 61, the lock-member fixation plate 63, the spring 65, and the lock member 60, which project from the holder portion 66, are accommodated in the lock-mechanism accommodating recessed portions 66d and 41f, and a distal end portion side of the lock member 60 is inserted into the through hole 41g under a state in which the shaft case 50 is mounted to the bearing case 41. Moreover, the spring 65 is compressed in the axial direction between the bottom portion 66a of the holder portion 66 and the lock-member fixation plate 63 under the state in which the shaft case 50 is mounted to the bearing case 41. The lock member 60 is always urged in an advancing direction (left side in FIG. 1) by the compressed spring 65.

Figure 9:
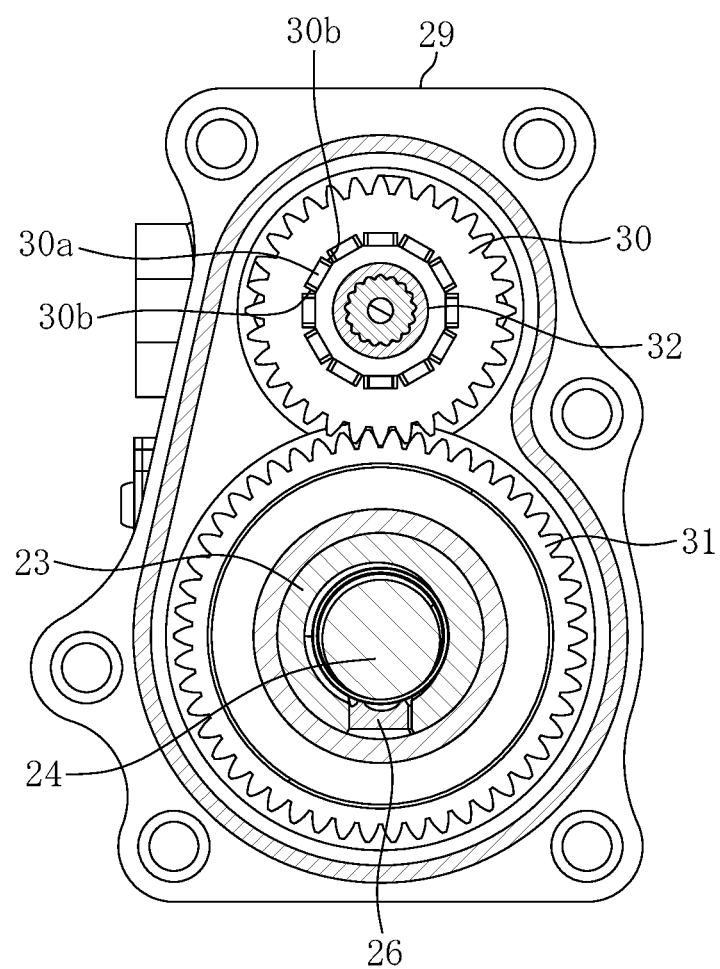
FIG. 9 is a transverse sectional view taken along the line C-C in FIG. 1 and seen from a direction indicated by the arrows C.

The drive gear 30 is arranged in the advancing direction of the lock member 60. The drive gear 30 has engagement holes 30a with which the distal end portion of the lock member 60 can be engaged. As illustrated in FIG. 9, which is a transverse sectional view taken along the line C-C in FIG. 1 and seen from a direction indicated by the arrows C, the engagement holes 30a are formed at a plurality of locations in a circumferential direction of the drive gear 30. The rotation of the drive gear 30 is restricted through the engagement of the lock member 60 with any one of these engagement holes 30a. Moreover, tilted surfaces 30b may be formed at an entrance portion of each of the engagement holes 30a (see FIG. 9). Through formation of the engagement holes 30a in such a manner, such an effect that the lock member 60 is smoothly inserted into the engagement hole 30a along the tilted surfaces 30b is expected.

A lock sensor 69 configured to detect a locking state is mounted to the bearing case 41 (see FIG. 8). The lock sensor 69 is a contact sensor comprising a contact element 69a formed of an elastic member such as a plate spring. When the lock member 60 advances to be engaged with the engagement hole 30a (brought into a locking state), the lock member 60 pushes the contact element 69a so that the lock sensor 69 detects the locking state.

The lock mechanism part 7 having the configuration described above performs, for example, an operation described below. Specifically, when power is not supplied to the locking motor 64, the lock member 60 is held at the advanced position by the spring 65, and is in the locking state in which the distal end portion of the lock member 60 is engaged with the engagement hole 30a of the drive gear 30. When the power is supplied to the driving motor 10 in order to start the driving of the ball screw shaft 24 in this state, the power is also supplied to the locking motor 64, and the locking motor 64 drives the lock member 60 in a retreating direction. With this, the sliding screw shaft 62 rotates. Meanwhile, the rotation of the sliding screw nut 61 is restricted through the insertion of the flat-plate-shaped distal end portion of the lock member 60 into the through hole 41g. Thus, when the sliding screw shaft 62 rotates, the sliding screw nut 61 retreats against the urging force of the spring 65, and the lock member 60 retreats integrally with the sliding screw nut 61. With this, the distal end portion of the lock member 60 is disengaged from the engagement hole 30a of the drive gear 30, and the locking state is thus released. In this way, while the ball screw shaft 24 is being driven, the lock member 60 is held at the retreated position, and the drive gear 30 is thus held in the unlocked state.

After that, when the supply of power to the driving motor 10 is shut off and the drive of the ball screw shaft 24 is thus stopped, the supply of power to the locking motor 64 is also shut off. With this, the driving force for causing the lock member 60 to retreat is no longer generated, and the lock member 60 is thus pushed to move in the advancing direction by the spring 65. Then, the locking state is brought about through the engagement of the distal end portion of the lock member 60 with the engagement hole 30a of the drive gear 30, thereby restricting the rotation of the drive gear 30.

Through restriction of the rotation of the drive gear 30 by the lock member 60 in such a manner, the ball screw shaft 24 is held in the state in which the ball screw shaft 24 does not retreat. With this, even when an external force is input from the object device to be operated to the ball screw shaft 24 side, a position of the ball screw shaft 24 can be held at a predetermined position. This configuration is particularly preferred for a case in which the electric actuator is applied to an application that requires holding a position of the ball screw shaft 24.

In this embodiment, the lock member 60 is caused to retreat by driving the locking motor 64. Conversely, the locking motor 64 may be driven to cause the lock member 60 to advance. Moreover, the lock member 60 may be caused to advance and retreat by rotating the locking motor 64 forward and backward.

A position detection device configured to detect a position of the operation part 6 provided on the ball screw shaft 24 in a stroke direction is mounted to the electric actuator 1. In the position detection device, a permanent magnet 73 (see FIG. 1) serving as a sensor target is provided on the ball screw shaft 24, and magnetic sensors 70 serving as non-contact sensors configured to detect the position of the permanent magnet 73 in the stroke direction are arranged on the boot cover 39 covering the boot 36 (see FIG. 2 and FIG. 3).

Figure 10:
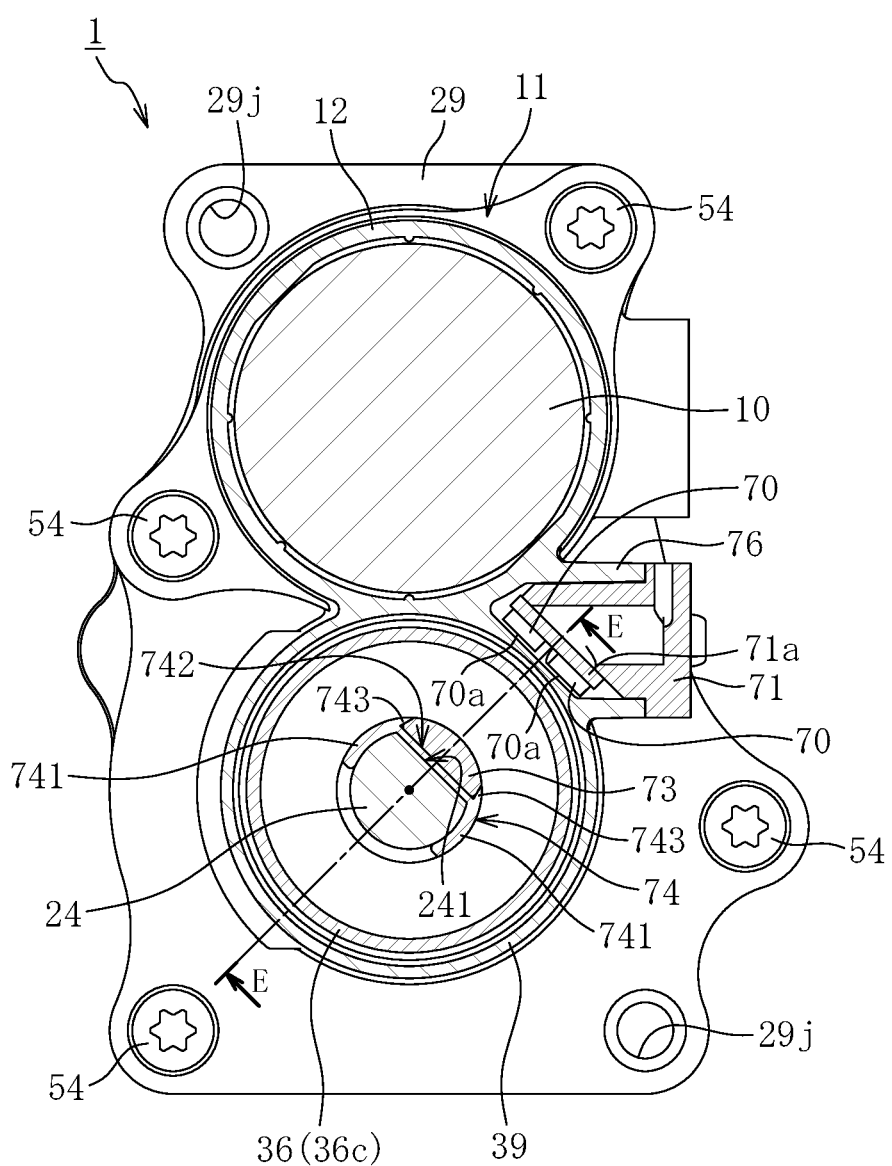
FIG. 10 is a transverse sectional view taken along the line D-D in FIG. 1 and seen from a direction indicated by the arrows D.

The magnetic sensors 70 are provided on the boot cover 39 formed integrally with the motor case 11. Specifically, as illustrated in FIG. 10, a sensor case 76 opening toward the outside of the motor case 11 is formed in a vicinity of a coupling portion between a portion (case main body 12) of the motor case 11 configured to receive the driving motor 10 and the boot cover 39. Then, a sensor base 71 to which the two magnetic sensors 70 are mounted is fixed to the sensor case 76 by fastening bolts 72 (see FIG. 3). With this, the magnetic sensors 70 are brought into a state in which the magnetic sensors 70 are opposed to the permanent magnet 73 through the boot cover 39. In an exact sense, the magnetic sensors 70 are arranged on a radially outer side of the ball screw shaft 24 so that detection surfaces 70a of the magnetic sensors 70 face the permanent magnet 73 as seen in a direction illustrated in FIG. 10. In this embodiment, both of the case main body 12 of the motor case 11 and the boot cover 39 have a cylindrical shape, and are coupled to one another while outer peripheral surfaces thereof are in contact with one another (see FIG. 3). The sensor case 76 is formed in the vicinity of the coupling portion between the case main body 12 and the boot cover 39, in other words, the sensor case 76 is formed at a location (retreating portion) retreating inward from the outer peripheral surfaces of the boot cover 39 and the motor case 11, and there is thus provided a state in which a degree of protrusion of the sensor case 76 toward the outside of the motor case 11 is suppressed as much as possible. In this case, the magnetic sensors 70 are in a state in which the magnetic sensors 70 are covered with the boot cover 39, the sensor case 76, and the sensor base 71. Moreover, in this case, the ball screw shaft 24 serving as the movable part is arranged inside the boot 36, and the boot cover 39 thus functions as a shaft cover configured to cover at least a part of the movable part in a longitudinal direction.

Figure 11:
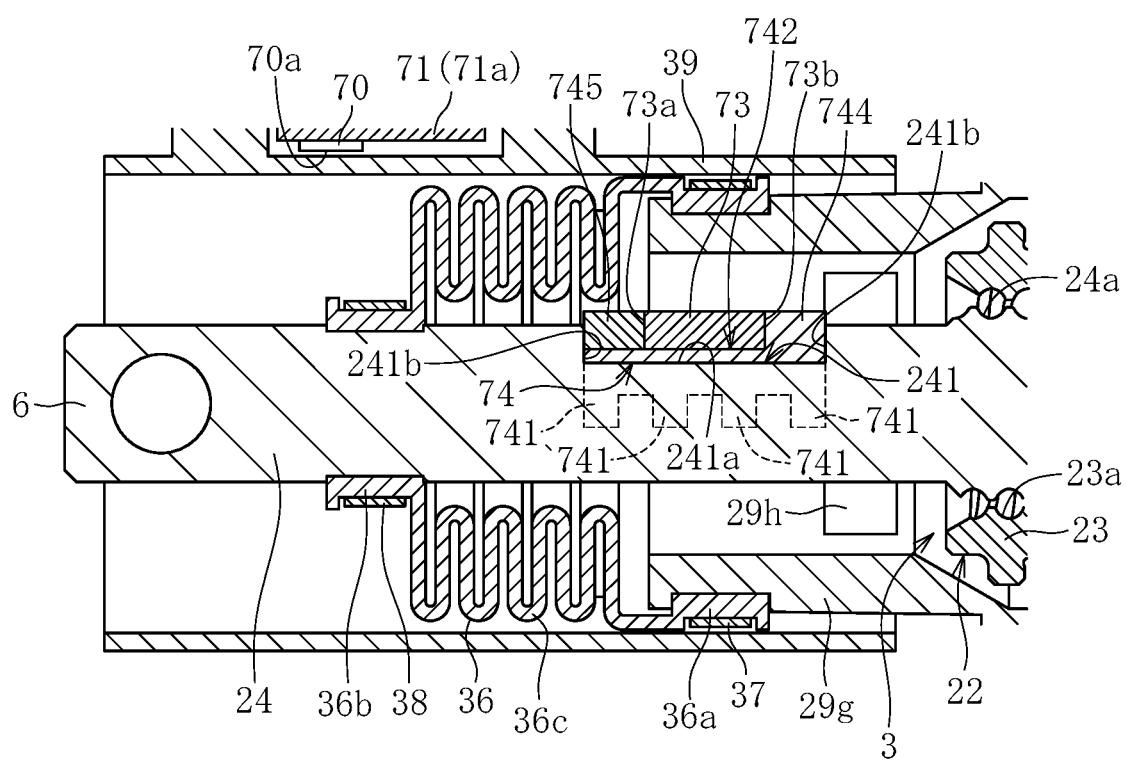
FIG. 11 is a sectional view taken along the line E-E in FIG. 10 and seen from a direction indicated by the arrows E.
Figure 15:
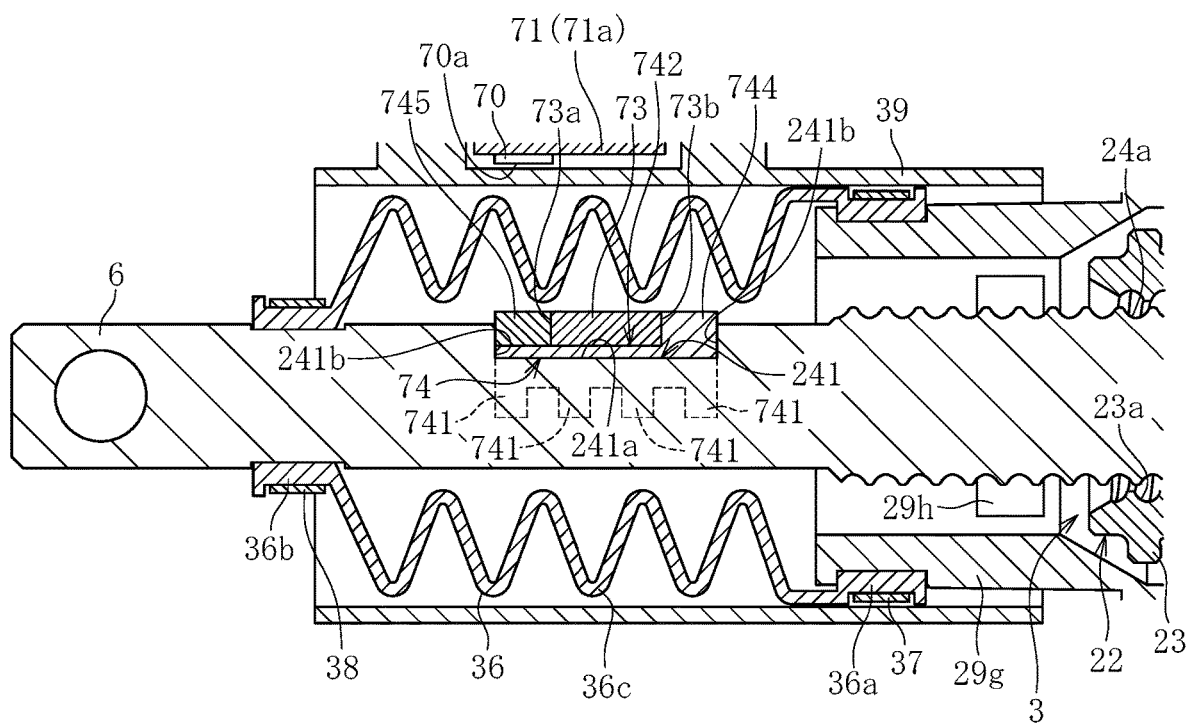
FIG. 15 is a sectional view of FIG. 11 in a state in which the ball screw shaft has advanced.

Moreover, the magnetic sensors 70 are arranged at an intermediate position of the boot cover 39 in the axial direction (stroke direction) (see FIG. 11). On this occasion, in terms of a positional relationship with the permanent magnet 73, it is preferred that the magnetic sensors 70 be arranged within a stroke range (see FIG. 11 and FIG. 15) of the permanent magnet 73 mounted to the ball screw shaft 24.

A magnetic sensor of any suitable type can be used as the magnetic sensor 70. Among those, a magnetic sensor such as a Hall IC and a linear Hall IC of a type that uses the Hall effect to detect a direction and a magnitude of a magnetic field can be suitably used. As a matter of course, the stroke sensor of the position detection device of the present invention is not limited to the magnetic sensor 70. A publicly-known sensor can be applied as long as the sensor can use a detection medium other than the magnetism to detect, in the non-contact manner, the position of the sensor target.

Moreover, it is preferred that all of the sensor base 71 (particularly the base plate 71a of the sensor base 71 in contact with the magnetic sensors 70), the sensor case 76, and the boot cover 39, which cover a periphery of the magnetic sensors 70, be formed of a nonmagnetic material. For example, those components are formed of resin.

Meanwhile, the permanent magnet 73 serving as the sensor target is arranged in the ball screw shaft 24 serving as the movable part. In detail, as illustrated in FIG. 1, the permanent magnet 73 is arranged between the operation part 6 and the spiral groove 24a out of the ball screw shaft 24.

Moreover, in terms of a position relationship with the magnetic sensors 70, as illustrated in FIG. 11, the permanent magnet 73 is arranged in a portion covered with the boot 36 out of the outer peripheral surface of the ball screw shaft 24. As a result, the boot 36 is always present between the magnetic sensors 70 and the permanent magnet 73. As a matter of course, in the first invention of the present application, the arrangement form of the non-contact sensors (magnetic sensors 70) and the sensor target (permanent magnet 73) is not limited to the form illustrated in FIG. 11. When it is possible, the sensor target may be arranged on a side closer to the operation part 6 with respect to the portion of mounting the boot 36 out of the ball screw shaft 24.

Figure 12:
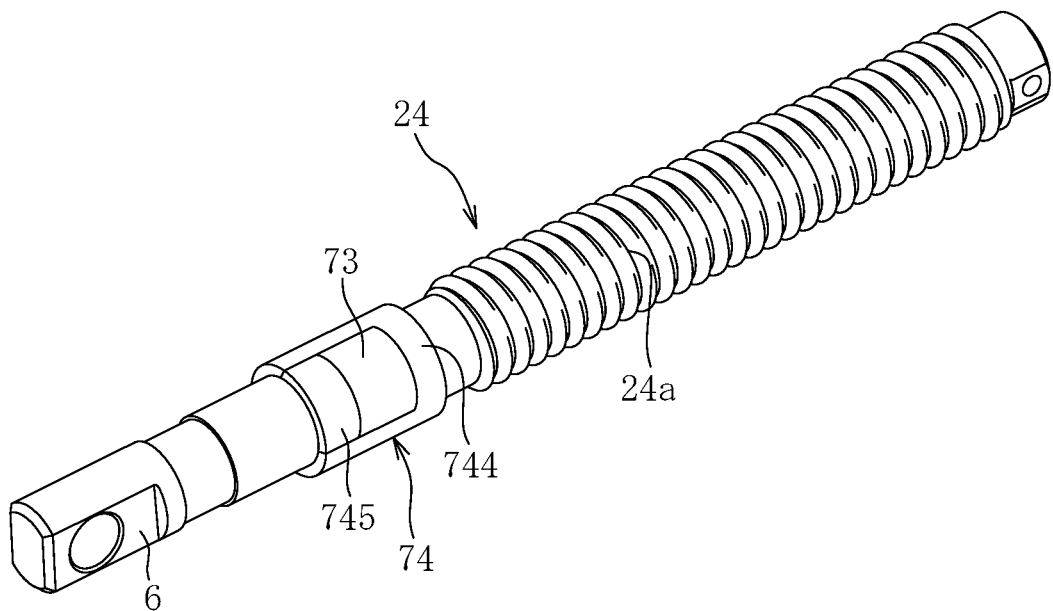
FIG. 12 is a perspective view for illustrating a ball screw shaft in a state in which a magnet is mounted.
Figure 13:
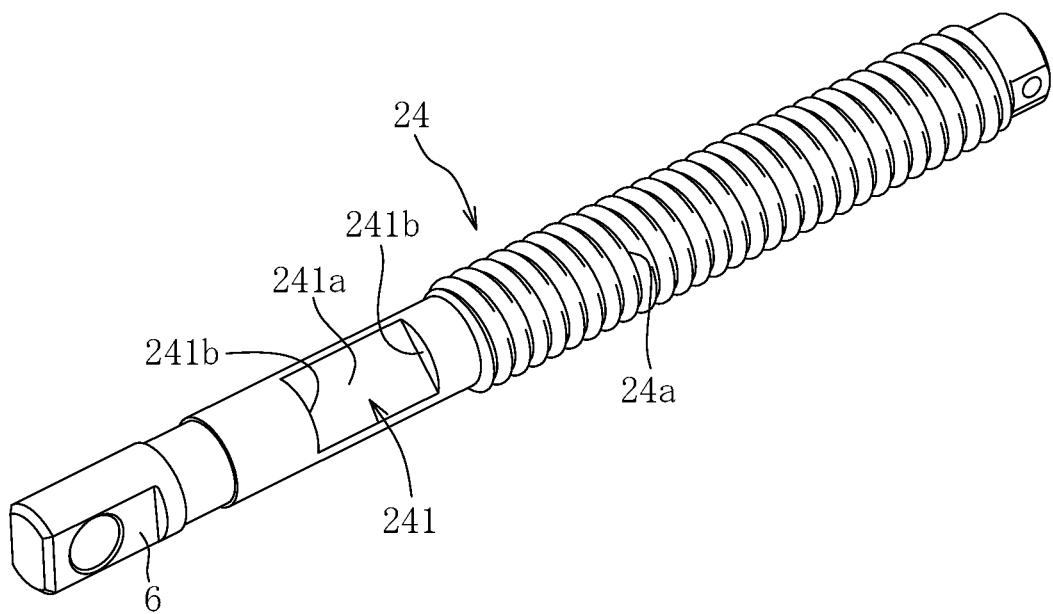
FIG. 13 is a perspective view for illustrating the ball screw shaft.

FIG. 12 is perspective view for illustrating the ball screw shaft 24 (ball screw shaft unit) in a state in which the sensor target including the permanent magnet 73 is mounted to a predetermined position in the axial direction. Moreover, FIG. 13 is a perspective view for illustrating the ball screw shaft 24 as a single unit. As illustrated in FIG. 12 and FIG. 13, a cutout portion 241 is formed at a predetermined position of the ball screw shaft 24 in the axial direction. The sensor target is mounted to the cutout portion 241. A shape of the cutout portion 241 is appropriately set in accordance with a shape of the magnet holder 74, which is an object to be mounted. In the illustrated example, the cutout portion 241 comprises a flat surface 241a and a pair of axial end surfaces 241b. The flat surface 241a is obtained by cutting the ball screw shaft 24 at an imaginary plane passing a position displaced from the center of the ball screw shaft 24 in the radial direction. The pair of axial end surfaces 241b are positioned on both sides of the flat surface 241a in the axial direction, and have a shape of rising from the flat surface 241a in the radial direction of the ball screw shaft 24.

Figure 14A:
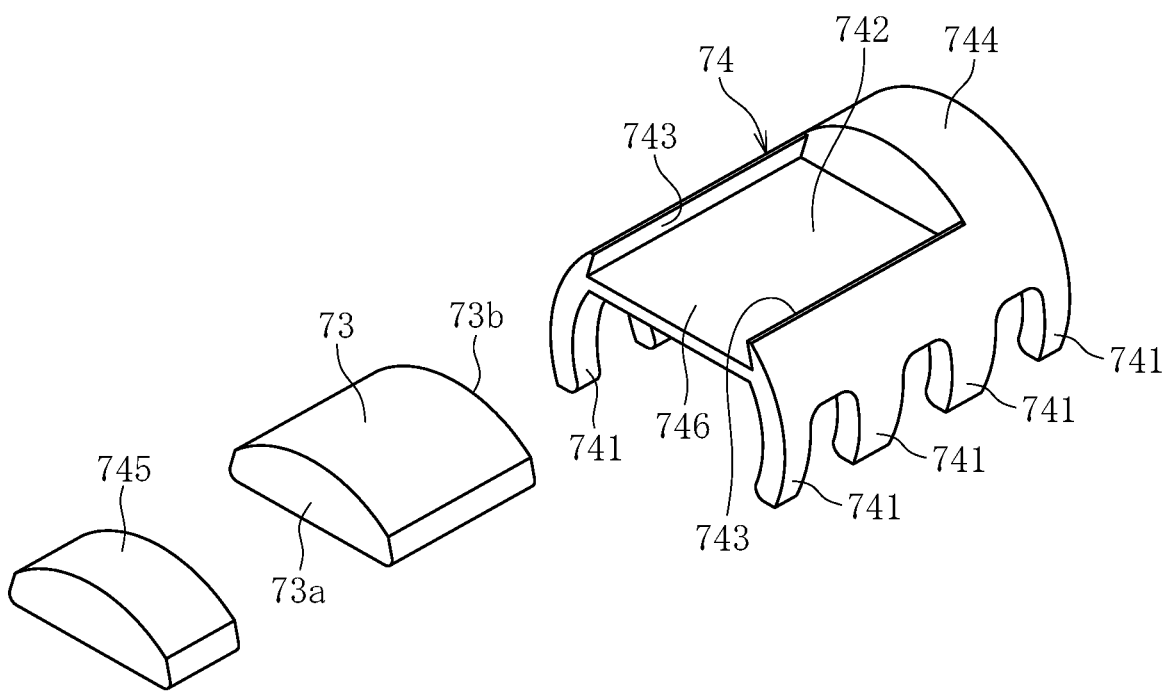
FIG. 14A is a perspective view for illustrating a sensor target comprising a magnet and a magnet holder.
Figure 14B:
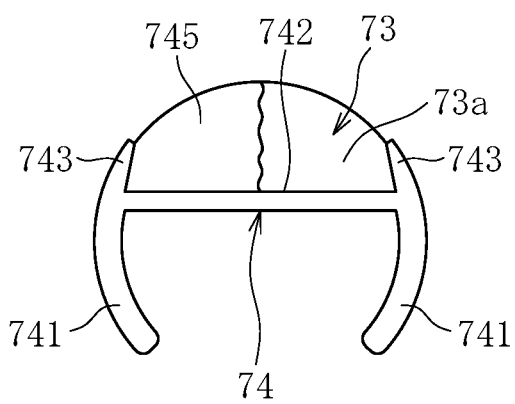
FIG. 14B is a front view for illustrating the sensor target comprising the magnet and the magnet holder.

FIG. 14A and FIG. 14B are a perspective view and a front view, respectively, for illustrating the sensor target comprising the permanent magnet 73. As illustrated in FIG. 14A and FIG. 14B, the sensor target comprises the permanent magnet 73 and the magnet holder 74 configured to hold the permanent magnet 73. A pair of or a plurality of pairs (four pairs in the illustrated example) of fitting claws 741 that can fit to the outer peripheral surface of the ball screw shaft 24, which is the cutout portion 241 in this embodiment, are formed in the magnet holder 74. Moreover, a fitting recessed portion 742 to which the permanent magnet 73 can be fitted is provided on an opposite side of a protruding side of the fitting claws 741.

The fitting claws 741 form a shape following the outer peripheral surface of the ball screw shaft 24, which is an object of mounting (see FIG. 10 and FIG. 14B). For example, through pressing the magnetic holder 74 from the cutout portion 241 side, the fitting claws 741 of each of the pairs are configured to deform toward directions toward which the fitting claws 741 separate from one another, and recover to original positions in a state in which the magnetic holder 74 is in contact with the flat surface 241a of the cutout portion 241.

The fitting recessed portion 742 comprises a pair of side wall portions 743, a first sandwiching portion 744, and a second sandwiching portion 745. The first sandwiching portion 744 is formed integrally with the pair of the side wall portions 743. The second sandwiching portion 745 is formed independently of the pair of the side wall portions 743 and the first sandwiching portion 744, and is capable of sandwiching the permanent magnet 73 between the second sandwiching portion 745 and the first sandwiching portion 744. In this case, only one side in the axial direction out of four sides of an approximately rectangular shape surrounding the fitting recessed portion 742 is opened. The permanent magnet 73 and the second sandwiching portion 745 can be inserted toward the fitting recessed portion 742 from an opening portion 746 side (see FIG. 14).

Moreover, the pair of the side wall portions 743 have such shapes that approach one another toward distal end sides (see FIG. 14B). With this, a movement of the permanent magnet 73 toward the radially outer side (top side in FIG. 14B) fitted to the fitting recessed portion 742 is restricted.

The magnet holder 74 of the above-mentioned configuration is basically made of any suitable material as long as the magnet holder 74 can be fitted to the ball screw shaft 24 while the one or the plurality of pairs of fitting claws 741 elastically deform. For example, in consideration of influence on the magnetic field formed by the permanent magnet 73 therearound, it is preferred that the magnet holder 74 be formed of a nonmagnetic material. When the elastic deformation property of the fitting claws 741 is considered together, it is preferred that the magnet holder 74 be made of resin.

Moreover, a magnetization direction of the permanent magnet 73 is a direction orthogonal to both of end surfaces 73a and 73b. In other words, the permanent magnet 73 is magnetized so that the one end surface 73a forms the N pole and the another end surface 73b forms the S pole. With this, the magnetization direction of the permanent magnet 73 in the state in which the permanent magnet 73 is mounted to the ball screw shaft 24 matches the liner motion direction of the ball screw shaft 24 (see FIG. 11).

In the position detection device having the configuration described above, when the ball screw shat 24 advances or retreats, a position of the permanent magnet 73 with respect to the magnetic sensors 70 changes (see FIG. 11 and FIG. 15), and a magnetic field at the arrangement locations of the magnetic sensors 70 also changes along with such change. Thus, a direction and a position of a stroke of the permanent magnet 73 as well as a direction and a position of a stroke of the operation part 6 provided on one end side of the ball screw shaft 24 can be acquired through the magnetic sensors 70 detecting the change in the magnetic field (for example, a direction and a strength of magnetic flux).

Figure 16:
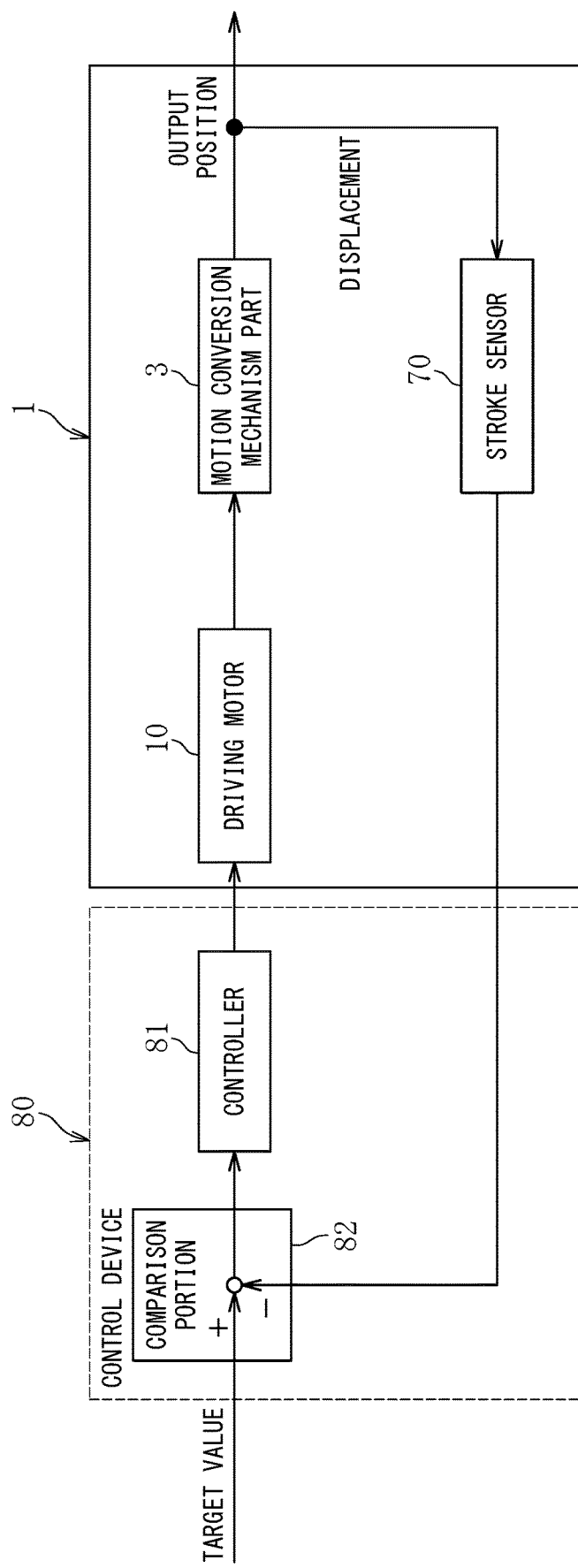
FIG. 16 is a control block diagram of the electric actuator.

Next, with reference to FIG. 16, description is made of feedback control using the magnetic sensor 70.

As illustrated in FIG. 16, when a target value is transmitted to a control device 80, a control signal is transmitted from a controller 81 of the control device 80 to the driving motor 10. The target value is, for example, a stroke value calculated by an ECU provided at an upper position of a vehicle based on an operation amount when the operation amount is input to the ECU.

When the driving motor 10 receives the control signal, the driving motor 10 starts the rotational drive, and the driving force thereof is transmitted to the ball screw shaft 24 through intermediation of the planetary-gear speed reduction mechanism 18, the drive gear 30, the driven gear 31, and the ball screw nut 23, and the ball screw shaft 24 thus advances. As a result, the ball screw shaft 24 advances (or retreats) in the direction parallel to the output shaft 10a of the driving motor 10. With this, the device of the object to be operated arranged on the distal end portion side (actuator head side) of the ball screw shaft 24 is operated.

At this time, the stroke value (position in the axial direction) of the ball screw shaft 24 is detected by the magnetic sensor 70. The detection value detected by the magnetic sensor 70 is transmitted to a comparison portion 82 of the control device 80, and a difference between the detection value and the target value is calculated. Then, the driving motor 10 is driven until the detection value matches the target value. When the electric actuator 1 of this embodiment is applied to, for example, a shift-by-wire system, a shift position can reliably be controlled by feeding back the stroke value detected by the magnetic sensor 70 to control the position of the ball screw shaft 24 in such a manner.

The configuration and the operation of the electric actuator 1 of this embodiment are described above. Now, regarding the electric actuator 1 of this embodiment, description is made of actions and effects of the first invention of the present application, and, then, description is made of actions and effects of the second invention of the present application.

As described above, the electric actuator 1 according to the first embodiment of the present application is formed through arrangement of the operation part 6 serving as the actuator head and the driving motor 10 on the same side in the longitudinal direction of the ball screw shaft 24 so that the magnetic sensors 70 can be arranged on the motor case 11 (see FIG. 1). With such a configuration, it is not required that a dedicated case for mounting the magnetic sensors 70 be manufactured independently of the existing cases (the motor case 11 and the transmission gear case 29). Thus, the configuration capable of detecting the position of the ball screw shaft 24 can be provided without increasing the number of the cases. Moreover, the position detection device comprises the sensor target arranged in the ball screw shaft 24 and the magnetic sensors 70 configured to detect the position of the sensor target in the linear motion direction in the non-contact manner. Thus, the position of the ball screw shaft 24 can be detected more directly than in the related-art configuration, and, with this, the position detection precision can be increased. Moreover, with the position detection device comprising the sensor target and the magnetic sensors 70, the number of the parts directly relating to the position detection can be reduced, thereby being capable of achieving the size reduction of the position detection device. Thus, this configuration is preferred for downsizing of the electric actuator 1 as well as for the series production. As a matter of course, the reduction in number of parts generally leads to the cost reduction, and this configuration is also preferred in terms of cost.

Moreover, as described above, the electric actuator 1 according to the second invention of the present application has the configuration in which the boot 36 is arranged between the ball screw shaft 24 serving as the movable part and the cylindrical portion 29g of the transmission gear case 29 arranged around the ball screw shaft 24, in which the permanent magnet 73 is arranged in the portion covered with the boot 36 of the ball screw shaft 24, and in which the magnetic sensors 70 are arranged on the boot cover 39 covering the boot 36. Therefore, entry of foreign substances inside the ball screw 22 serving as the motion conversion mechanism is prevented by the boot 36. Moreover, the boot 36 is present between the magnetic sensors 70 and the permanent magnet 73 serving as the sensor target. However, the boot 36 is made of resin or rubber, and hence the detection of the magnetic field by the magnetic sensors 70 is not obstructed. Therefore, the position of the ball screw shaft 24 in the linear motion direction can accurately be detected while the inside of the ball screw 22 is sealed by the boot 36. Moreover, through arrangement of the permanent magnet 73 in the portion of the ball screw shaft 24 covered with the boot 36, degradation and damage due to exposure of the permanent magnet 73 to the external air can be prevented as much as possible. Thus, a highly precise position detection function can thus be provided for a long period.

Figure 17:
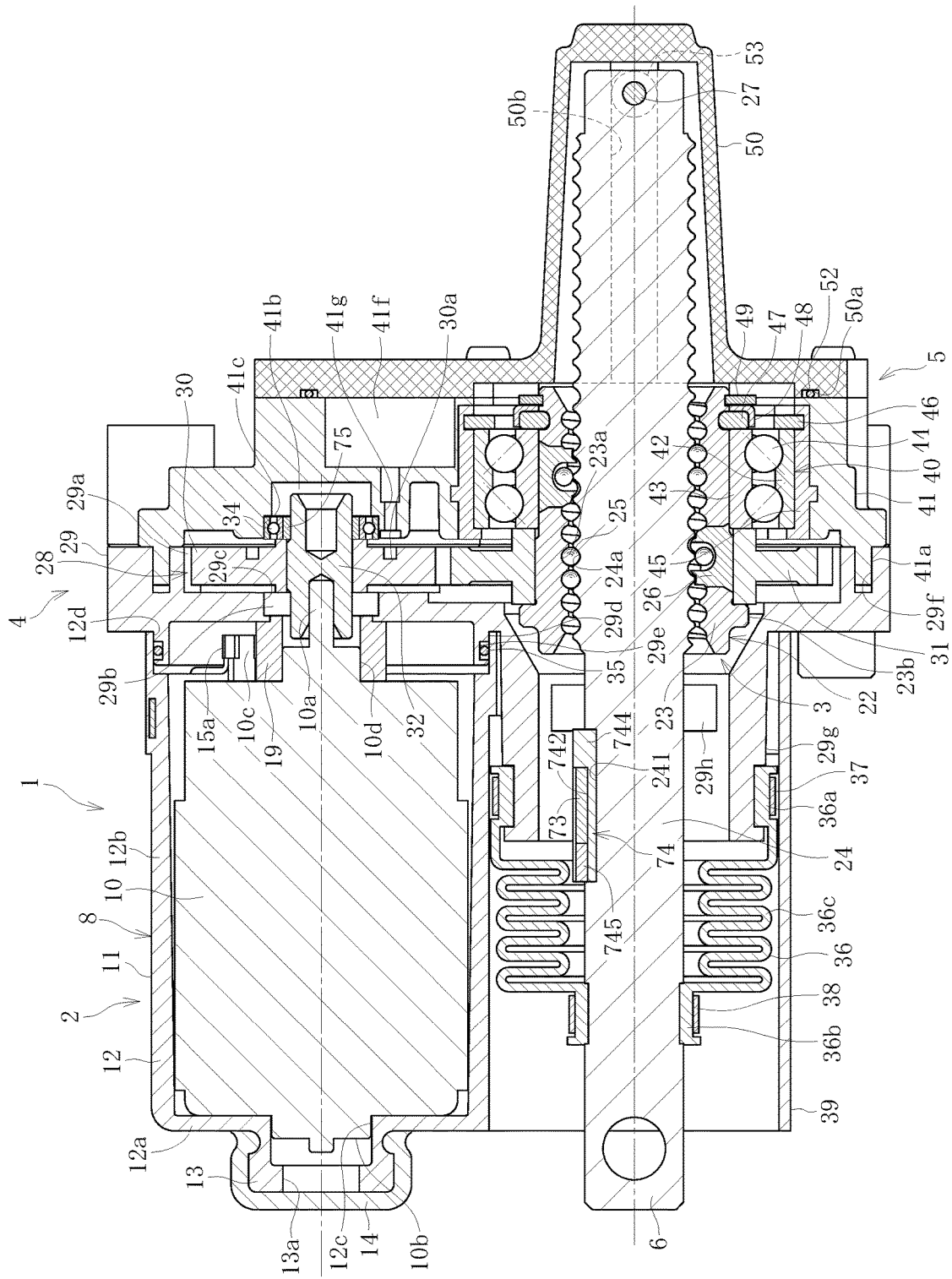
FIG. 17 is a vertical sectional view of the electric actuator according to another embodiment of the first invention and the second invention of the present application.

In both the first invention and the second invention of the present application, when the speed reduction mechanism part 9 and the lock mechanism part 7 are not required, as illustrated in FIG. 17, the electric actuator 1 without the speed reduction mechanism part 9 and the lock mechanism part 7 can be formed. The electric actuator 1 illustrated in FIG. 17 is configured, compared to the electric actuator 1 illustrated in FIG. 1, by eliminating the speed reduction mechanism part 9, directly coupling the motor part 8 and the driving force transmission part 4 to each other, and replacing the shaft case 50 by one without the holder portion 66 to which the lock mechanism part 7 is mounted. In this case, the speed reduction mechanism part 9 is not provided. Thus, the output shaft 10a of the driving motor 10 is press-fitted to the gear boss 32, and the rolling bearing 33 on the transmission gear case 29 side configured to support the gear boss 32 is omitted. Moreover, a member to be fitted to the motor adaptor 19, to which the output shaft 10a of the driving motor 10 is mounted, is changed from the speed reduction gear case 17 to the transmission gear case 29, and is thus replaced by one having a different shape conforming to a fitting shape of the member to be fitted to the motor adaptor 19. The other configurations are the same as those of the embodiment illustrated in FIG. 1. The electric actuator 1 of the embodiment illustrated in FIG. 17 is controlled to operate basically in the same manner as in the embodiment illustrated in FIG. 1 except that the driving force from the driving motor 10 is directly transmitted to the driving force transmission part 4 without intermediation of the speed reduction mechanism part 9. Thus, description of the control and the operation is omitted.

As described above, the electric actuator 1 illustrated in FIG. 17 can be formed by replacing only a part of the components of the electric actuator 1 illustrated in FIG. 1, and the other many components can be the same components, thereby being capable of achieving the series production at a low cost. In particular, in the embodiment, all of an inner diameter of the motor case 11 on the opening portion 12d side, an outer diameter of the speed reduction gear case 17 on the motor case 11 side, and an outer diameter of the transmission gear case 29 on the speed reduction gear case 17 side are set equal, and the motor case 11 is thus configured to be capable of being fitted to any of the speed reduction gear case 17 and the transmission gear case 29. Therefore, even when the speed reduction mechanism part 9 is omitted, the motor part 8 and the driving force transmission part 4 can be coupled to one another by only replacing the motor adaptor 19 with other motor adaptor. Moreover, the motor case 11 with which the boot cover 39 is formed integrally and the transmission gear case 29 can directly be used without changes, and, also as the magnetic sensors 70 and the sensor base 71 forming the position detection device, completely the same parts as those of the embodiment can be used. As a result, also in the case of mounting the position detection device, the series production of the electric actuator 1 can be achieved at a low cost. As a specific example of deployment as a plurality of types along with the series production of the electric actuator 1, an electric parking brake mechanism for vehicles including two-wheeled vehicles, an electric/hydraulic brake mechanism, an electric shift change mechanism, and an electric power steering as well as a 2 WD/4 WD electric switching mechanism and an electric shift change mechanism for an outboard engine (for a vessel propulsion engine) can be exemplified.

Figure 18:
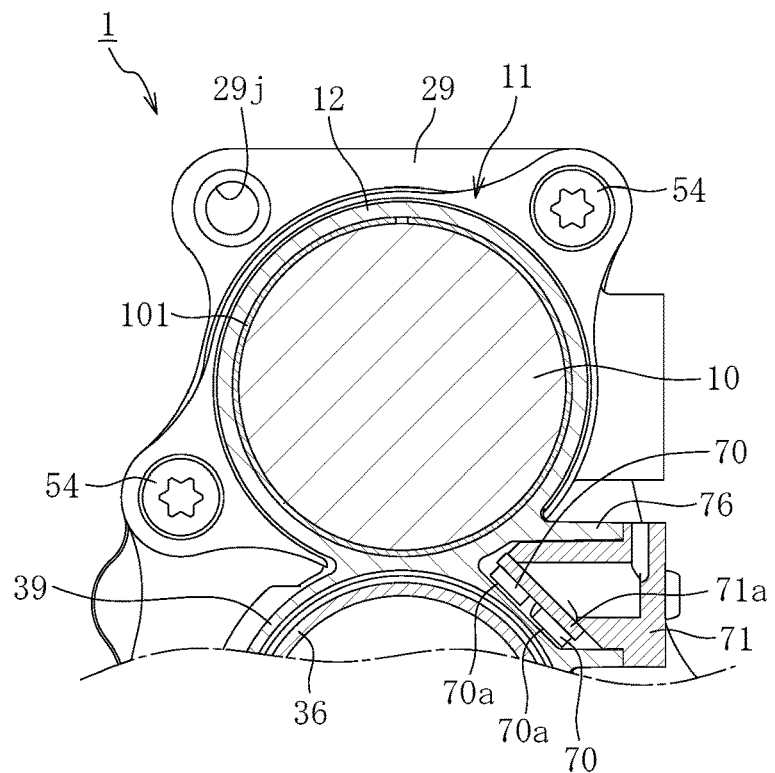
FIG. 18 is a transverse sectional view of the electric actuator according to another embodiment of the second invention of the present application.

FIG. 18 is a transverse sectional view of the electric actuator 1 according to another embodiment of the second invention of the present application. As illustrated in FIG. 18, the electric actuator 1 according to this embodiment is different from the electric actuator 1 illustrated in FIG. 1 in such a point that a magnetic shielding plate 101 is arranged around the driving motor 1 between the driving motor 1 and the magnetic sensors 70.

In this embodiment, the magnetic shielding plate 101 has a cylindrical shape, and is in such a state as to be arranged between the driving motor 10 and the case main body 12 of the motor case 11. In order to facilitate assembly to an inner periphery of the case main body 12, as illustrated in FIG. 18, the magnetic shielding plate 101 may be shaped so that a cutout is formed at a part in the circumferential direction.

It is only required that a material of the magnetic shielding plate 101 be a magnetic material. From a point of view of preventing leakage of the magnetic flux to the outside of the driving motor 10 as much as possible, it is preferred that the magnetic shielding plate 101 be formed of a material having high magnetic permeability such as pure iron or low carbon steel (such as a material forming a yoke of the driving motor 10).

Through arrangement of the magnetic shielding plate 101 around the driving motor 101 as described above, the magnetic field the generation source of which is the driving motor 10 is shielded before the magnetic sensors 70, and the magnetic sensors 70 thus accurately detect only the magnetic field originally intended to be detected (the magnetic field generated by the permanent magnet 73), thereby being capable of precisely detecting the position of the ball screw shaft 24 in the linear motion direction.

Moreover, in this embodiment, the magnetic shielding plate 101 has the cylindrical shape, and is arranged between the driving motor 10 and the case main body 12, and the driving motor 10 is thus in a state in which the driving motor 10 is covered with the magnetic shielding plate 101 around the entire periphery. In this case, the magnetic shielding plate 101 serves as a type of a yoke capable of forming a closed magnetic circuit together with the motor, and a state in which the magnetic field (specifically such as magnetic flux) generated by the magnets inside the driving motor 10 leaks to the outside of the driving motor 10 can be prevented as much as possible. Thus, the influence of the magnetic field exerted on the magnetic sensors 70 can more reliably be eliminated, thereby being capable of achieving more precise position detection.

The magnetic shielding plate 101 has any suitable shape. For example, two magnetic shielding plates each having a semi-cylindrical shape formed through dividing the magnetic shielding plate 101 having the cylindrical shape into two portions may be used, which is not shown. Moreover, two of the magnetic shielding plates 101 each having the configuration described above may be used so as to overlap one another. Alternatively, the magnetic shielding plate 101 may be formed integrally with the motor case 11, and the motor case 11 may be, for example, formed through injection molding, and may comprise the magnetic spieling plate 101 as an insert part. In this case, the shape of the magnetic shielding plate 101 is not limited to the cylindrical shape, and the magnetic shielding plate 101 can take various forms.

Figure 19:
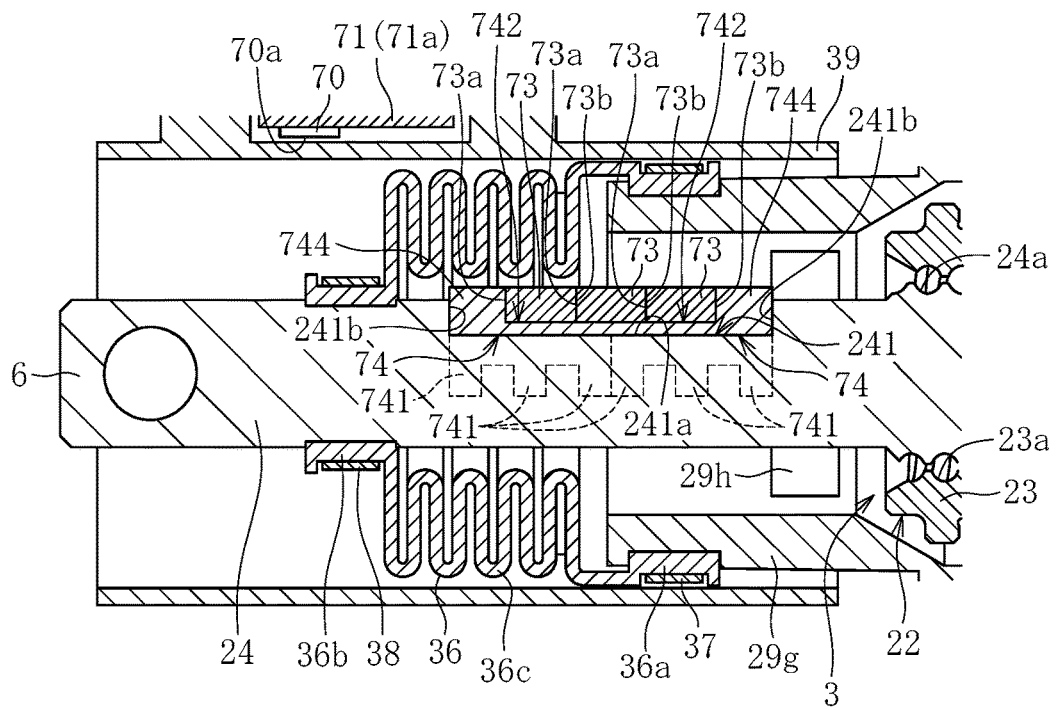
FIG. 19 is a sectional view for illustrating main parts of the electric actuator according to another embodiment of the second invention of the present application.

FIG. 19 is a sectional view for illustrating main parts of the electric actuator 1 according to another embodiment of the second invention of the present application. This sectional view is made on an imaginary plane of the electric actuator 1 at the same position as the plane illustrated in FIG. 11. As illustrated in FIG. 19, the electric actuator 1 according to this embodiment is in such a form that a plurality of (three in FIG. 19) the permanent magnets 73 forming the sensor target are arranged side by side in the stroke direction, for example, in order to extend a detectable region by the magnetic sensors 70 in the stroke direction. In this case, the plurality of permanent magnets 73 are arranged in the magnetization directions (the directions orthogonal to both of the end surfaces 73a and 73b), and are aligned in such directions that the N poles (one end surfaces 73a) and the S poles (other end surfaces 73b) are alternately arranged. Thus, also in this case, the magnetization directions of the permanent magnets 73 match the linear motion direction of the ball screw shaft 24 (see FIG. 19).

Moreover, in this case, as the magnet holder 74, a magnet holder comprising the plurality of pairs of fitting claws 741 and the fitting recessed portion 742 to which the permanent magnets 73 can be fit, as the magnet holder 74 illustrated in FIG. 14A and FIG. 14B, is used. In this embodiment, two magnet holders 74 are used. The two magnet holders 74 are fitted to the cutout portion 241 of the ball screw shaft 24 so that sides opposite to the first sandwiching portions 744 forming the fitting recessed portions 742, namely the open sides (the sides of the opening portions 746 illustrated in FIG. 14A) of the fitting recessed portions 742 are in abutment against one another, and the plurality of permanent magnets 73 are mounted through being fitted to the fitting recessed portions 742 in a state in which a fitting volume is increased. In this case, a state in which the plurality of permanent magnets 73 are sandwiched between the first sandwiching portions 744 forming the fitting recessed portions 742 in the respective magnet holders 74 is brought about. Therefore, the second sandwiching portions 745 (see FIG. 14A) formed independently of the fitting claws 741 and the like can be omitted.

Moreover, when the sensor target is arranged on the ball screw shaft 24 as described above, the boot 36 is interposed between any one of the permanent magnets 73 and the magnetic sensors 70. Through arrangement of all the permanent magnets 73 in the portion of the ball screw shaft 24 covered with the boot 36 as described above, the degradation and the damage due to the exposure of the magnets 73 to the external air can be prevented as much as possible, and a highly precise position detection function can thus be provided for a long period even in the case in which the plurality of permanent magnets 73 are provided.

Moreover, the electric actuator comprising both of the speed reduction mechanism part 9 and the lock mechanism part 7 and the electric actuator without both of them are described as examples of both of the first invention and the second invention of the present application, but the electric actuator comprising any one of them can be formed. Moreover, while, in the above-mentioned examples, the shaft case 50 is changed depending on the absence or presence of the lock mechanism part 7, a shape or a size of the shaft case 50 may be changed in accordance with the length of the ball screw shaft 24.

The motion conversion mechanism part 3 is not limited to the ball screw 22, and may be a sliding screw device. However, the ball screw 22 is more preferred in terms of reducing the rotation torque and downsizing the driving motor 10. Moreover, in the above-mentioned embodiments, although the configuration of using the double-row angular contact ball bearing as the support bearing 40 configured to support the motion conversion mechanism part 3 is exemplified, the support bearing 40 is not limited to this example. A pair of single-row angular contact ball bearings may be used in combination. Moreover, for the support bearing 40, not limited to the angular contact ball bearing, another double-row bearing using, for example, a deep groove ball bearing may be applied.

The speed reduction mechanism part 9 may be a speed reduction mechanism other than the planetary-gear speed reduction mechanism 18. Moreover, the driving force transmission part 4 may also have a function as a speed reduction mechanism through changing the gear ratio between the drive gear 30 and the driven gear 31.

Moreover, the present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

The invention claimed is:
1. An electric actuator, comprising:
a motor;
a motor case configured to accommodate the motor; and
a motion conversion mechanism configured to convert a rotary motion generated through drive by the motor into a linear motion in a direction parallel to an output shaft of the motor,
wherein the motion conversion mechanism comprises a movable part, which is arranged in parallel with the output shaft and is configured to perform the linear motion,
wherein the movable part and the motor overlap one another in a radial direction of the motor,
wherein a sensor target is arranged on the moveable part,
wherein a non-contact sensor configured to detect a position of the sensor target along a linear motion direction in a non-contact manner is arranged in the motor case,
wherein a shaft cover configured to cover a periphery of the movable part is provided integrally with the motor case,
wherein a retreating portion at which an outer peripheral surface of the motor case retreats inwardly compared to a periphery of the retreating portion is formed between a case main body of the motor case, which is configured to accommodate the motor, and the shaft cover, and
wherein the non-contact sensor is mounted to the retreating portion.
2. The electric actuator according to claim 1, wherein the non-contact sensor is arranged between the motor and the movable part.

3. The electric actuator according to claim 2,
wherein both of the case main body and the shaft cover have a cylindrical shape, are coupled to one another, and outer peripheral surfaces of the case main body and the shaft cover are in contact with one another, and
wherein the non-contact sensor is mounted in a vicinity of a coupling portion between the motor case and the shaft cover.

4. The electric actuator according to claim 3, wherein a magnetic shielding plate is arranged at least between the motor and the non-contact sensor about a periphery of the motor.

5. The electric actuator according to claim 1,
wherein both of the case main body and the shaft cover have a cylindrical shape, are coupled to one another, and outer peripheral surfaces of the case main body and the shaft cover are in contact with one another, and
wherein the non-contact sensor is mounted in a vicinity of a coupling portion between the motor case and the shaft cover.

6. The electric actuator according to claim 5, wherein an opening portion is formed in the vicinity of the coupling portion, and a sensor base to which the non-contact sensor is arranged is mounted to the opening portion.

7. An electric actuator, comprising:
a motor; and
a motion conversion mechanism configured to convert a rotary motion generated through drive by the motor to a linear motion in a direction parallel to an output shaft of the motor,
wherein the motion conversion mechanism comprises a movable part, which is arranged in parallel with the output shaft and is configured to perform the linear motion,
wherein a boot made of rubber or resin is arranged between the movable part and a fixed system around the movable part, and a magnet is arranged on a portion of the movable part covered with the boot, and
wherein a magnetic sensor configured to detect a position of the magnet along a linear motion direction is arranged around the boot.

8. The electric actuator according to claim 7,
wherein the magnet is mounted to the movable part through intermediation of a magnet holder configured to hold the magnet, and the magnetic sensor is mounted to a boot cover configured to cover a periphery of the boot, and
wherein both of the magnet holder and the boot cover are made of a nonmagnetic material.

9. The electric actuator according to claim 8, wherein the magnetic sensor is a Hall IC.

10. The electric actuator according to claim 8, wherein a magnetization direction of the magnet in a state in which the magnet is mounted to the movable part matches the linear motion direction of the movable part.

11. The electric actuator according to claim 8, wherein a magnetic shielding plate is arranged at least between the motor and the magnetic sensor about a periphery of the motor.

12. The electric actuator according to claim 7, wherein the magnetic sensor is a Hall IC.

13. The electric actuator according to claim 12, wherein a magnetization direction of the magnet in a state in which the magnet is mounted to the movable part matches the linear motion direction of the movable part.

14. The electric actuator according to claim 12, wherein a magnetic shielding plate is arranged at least between the motor and the magnetic sensor about a periphery of the motor.

15. The electric actuator according to claim 7, wherein a magnetization direction of the magnet in a state in which the magnet is mounted to the movable part matches the linear motion direction of the movable part.

16. The electric actuator according to claim 15, wherein a magnetic shielding plate is arranged at least between the motor and the magnetic sensor about a periphery of the motor.

17. The electric actuator according to claim 7, wherein a magnetic shielding plate is arranged at least between the motor and the magnetic sensor about a periphery of the motor.

18. The electric actuator according to claim 17, wherein the magnetic shielding plate has a cylindrical shape, and is arranged between the motor and a motor case configured to accommodate the motor.

* * * * *